United States Patent
Jacobs

(10) Patent No.: US 6,547,094 B1
(45) Date of Patent: Apr. 15, 2003

(54) INJECTION MOULDING

(76) Inventor: Ian Orde Michael Jacobs, 32 Volitans Avenue, Mt. Eliza, Victoria, 3930 (AU)

( * ) Notice: Subject to any disclaimer, the term of this patent is extended or adjusted under 35 U.S.C. 154(b) by 0 days.

(21) Appl. No.: 09/402,747

(22) PCT Filed: Apr. 14, 1998

(86) PCT No.: PCT/AU98/00255

§ 371 (c)(1),
(2), (4) Date: Dec. 21, 1999

(87) PCT Pub. No.: WO98/46409

PCT Pub. Date: Oct. 22, 1998

(30) Foreign Application Priority Data

Apr. 14, 1997 (AU) .......................................... P06174/97

(51) Int. Cl.[7] .......................... B29C 45/00; B29C 45/26; B65D 43/14; B65D 51/04
(52) U.S. Cl. ................ 220/839; 264/328.1; 264/328.18
(58) Field of Search .......................... 264/328.1, 328.18; 220/839

(56) References Cited

U.S. PATENT DOCUMENTS

| | | | |
|---|---|---|---|
| 4,192,935 A | | 3/1980 | Lovell et al. |
| 4,244,910 A | | 1/1981 | Yui et al. |
| 5,001,935 A | * | 3/1991 | Tekkanat et al. ............... 73/799 |
| 5,015,511 A | | 5/1991 | Treybig et al. |
| 5,085,742 A | | 2/1992 | Dollard et al. |
| 5,346,732 A | | 9/1994 | Lai et al. |
| 5,589,128 A | | 12/1996 | Lai et al. |

FOREIGN PATENT DOCUMENTS

| | | | |
|---|---|---|---|
| EP | 0055016 A1 | | 6/1982 |
| EP | 0442742 A1 | | 8/1991 |
| EP | 0530782 A1 | * | 3/1993 |
| EP | 0757076 A1 | * | 2/1997 |
| EP | 0 856 473 A1 | | 8/1998 |
| EP | 0 856 554 A1 | | 8/1998 |
| WO | WO9000960 A | | 2/1990 |
| WO | WO9200224 A | | 1/1992 |
| WO | WO-9205024 A1 | * | 4/1992 |
| WO | WO 99/13522 A1 | | 3/1999 |
| WO | WO 99/17390 A1 | | 4/1999 |

* cited by examiner

*Primary Examiner*—Leo B. Tentoni
(74) *Attorney, Agent, or Firm*—Dorsey & Whitney LLP

(57) ABSTRACT

A process for the manufacture of thin-walled articles comprising the steps of: 1) selecting a polymer blend having an ESCR of greater than 10 hours; i) a plurality (preferably 6 or more) of strips of the polymer blend incorporating any post molding treatment intended for the final article having the cross-sectional dimensions of 0.65 mm in thickness and 10 mm in width are injection molded under high shear, long flow length conditions, similar to those intended for use in the manufacture of the flexible thin-walled article; ii) the strips are bent back upon themselves and stapled 3 mm from the bend; iii) the bent strips are immersed in a solution of a stress crack agent and held at a temperature of 50° C.; iv) the strips are observed for signs of cracking, any signs of cracking are regarded as a failure; and v) the time to failure is when 50% of the strips show signs of cracking; 2) melting said polymer blend; 3) ramming the molten polymer blend into a mold, said mold having a cavity which produces a thin-walled article having a thin section less than 1 mm in thickness and wherein the thin section is substantially continuous for greater than 50 mm in the direction of flow of the molten polymer blend in the mold; and 4) removing from the mold the thin-walled article formed from the polymer blend.

22 Claims, 12 Drawing Sheets

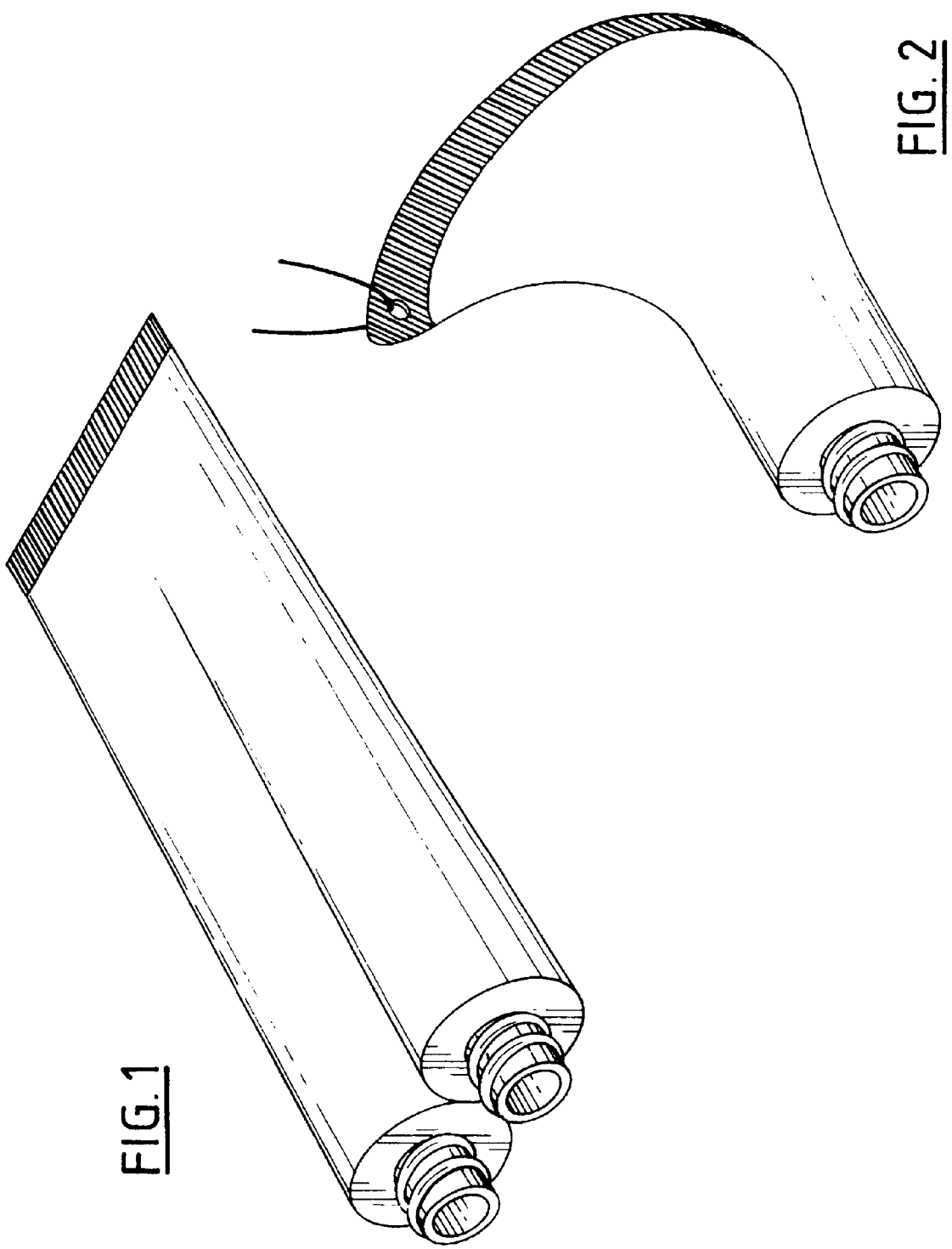

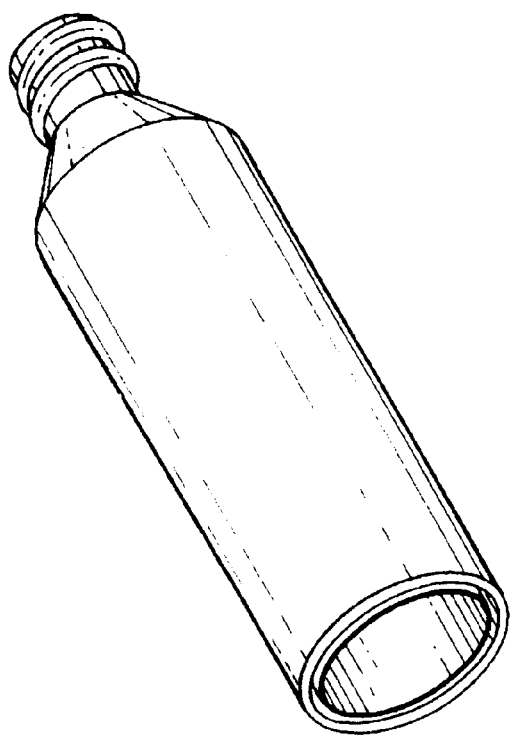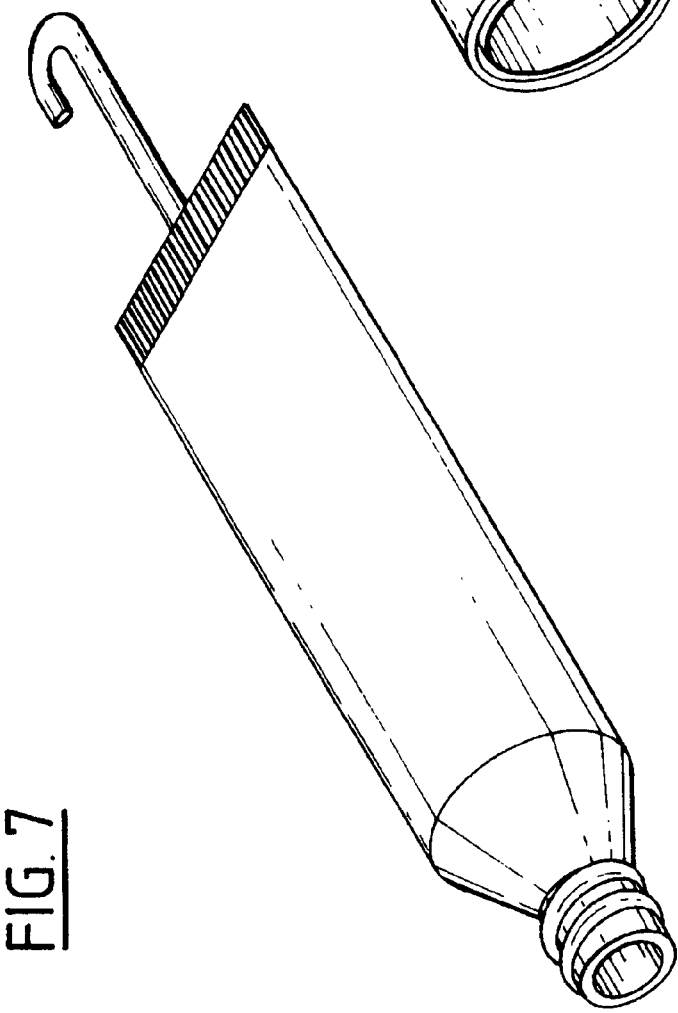

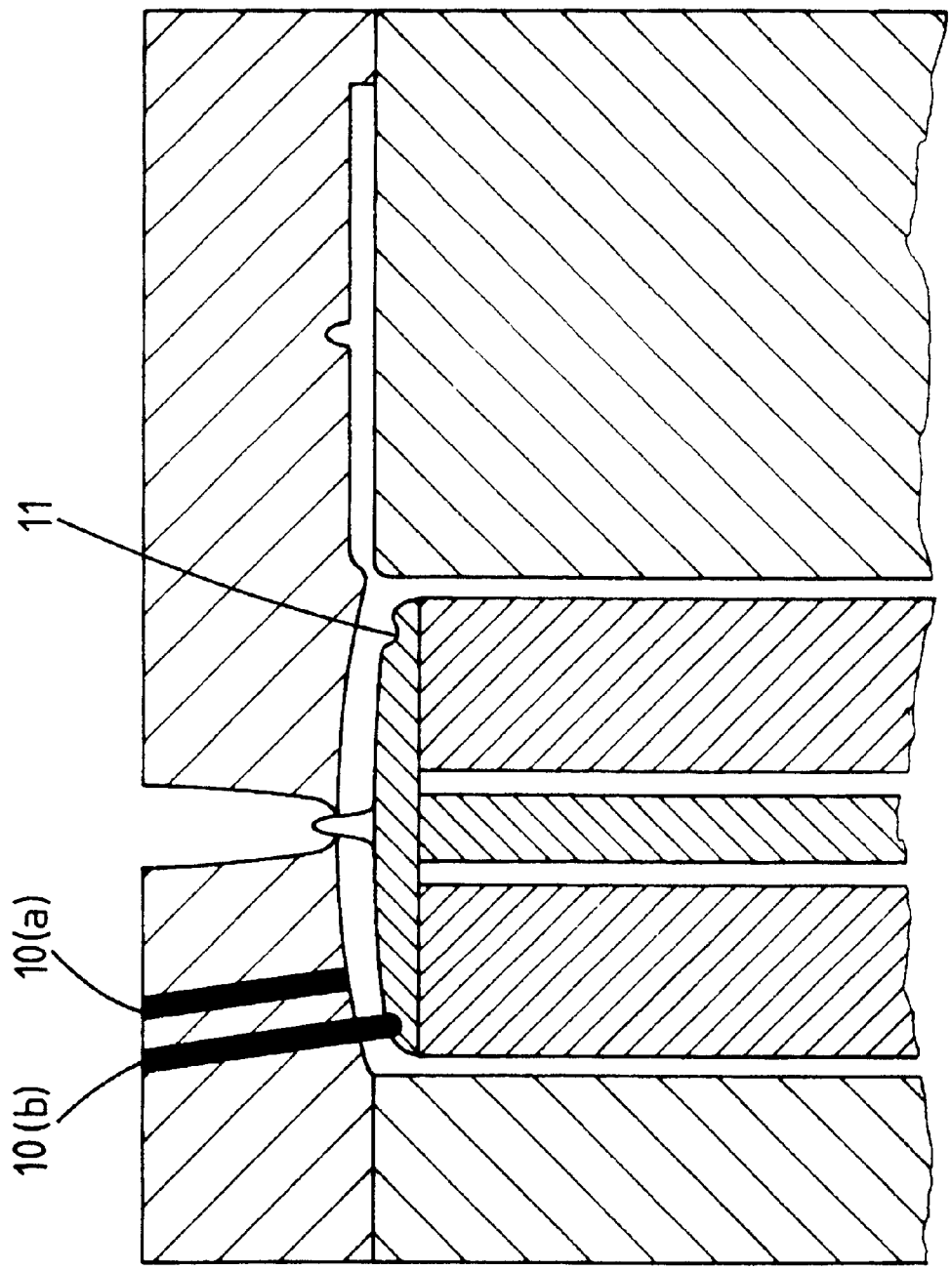

INJECTION MOULDING

FIELD OF THE INVENTION

The present invention relates to injection moulding processes, in particular to a process for injection moulding articles having thin sections such as thin-walled tubular containers as used in the cosmetics industry for lotions, moisturisers and the like.

FIELD OF INVENTION

Thin-walled tubular containers, such as those used in the cosmetics industry, are currently produced by a combination of extrusion, injection moulding and welding processes (generally referred to herein as the extrusion process). The body of the tube is extruded in the form of a continuous cylinder which is then cut into the desired length to form the body of the container. In a separate injection moulding process the "head and shoulders" of the tube are produced. The injection moulded "head and shoulders" are then welded to the extruded tube to form the container. Once the container is filled with product the tail end of the container is sealed by a further welding process. This process for producing tubes has a number of limitations, the main being the high equipment cost, the lack of variety of tube shapes that can be produced using it, no ability to provide various textured surface finishes or embossing as an integral part of the manufacturing process, and no ability to incorporate attachments/components such as closures and hooks during the manufacturing process. Low MFI polyethylene (MFI generally less than 2) is the preferred polymer for tube manufacture as it in general imparts the properties of good feel and flexibility required by customers and is suitable for extrusion processing. In addition, low MFI polyethylene offers sufficient product resistance and barrier properties to make it suitable for most products currently packed into tubes. In cases where the barrier properties of polyethylene are inadequate for particular applications, medium density polyethylene (MDPE), high density polyethylene (HDPE), polypropylene (PP) and multilayer polymerfilms are commonly used.

While the injection moulding of articles such as thin walled containers has been proposed, it has hitherto not been possible to injection mould such articles having relatively long, thin sections without the articles being too susceptible to failure to be of commercial or practical use. The main problems have been associated with the polymers used to injection mould tubes, in that the process of moulding a cylindrical or other shaped tube requires the polymer to simultaneously have a high MFI to enable said polymer to flow down the long, narrow and curved path dictated by the tube shape without the use of excessive injection pressures, yet to have sufficiently good mechanical properties to be able to withstand handling and resist the stress cracking effects of many of the products that will be packed in it. In order to injection mould a tube, conventional techniques would require the polymer to have flow properties capable of forming moulded parts with radii and a length/thickness ratio of 100 and often higher. Forcing a 'standard' polymer to flow in a mould with such dimensions introduces severe stresses into the polymer, these stresses being "frozen" into the article thus produced when the polymer rapidly cools below its crystallising temperature before these stresses can be relieved. These stresses result in the tube having surprising different and deteriorated properties relative to the other products moulded from the same polymers under less severe moulding conditions.

Further stresses are introduced into the tubes when they are filled with product and then crimped d sealed—most often by heat sealing or ultrasonic welding. This process involves bending the 'open' end of the tube back on itself through an angle of up to 180° to form the fold at the edge of the seal. This fold is in the direction of the flow of the polymer, which direction having been demonstrated to be the direction of maximum weakness of the moulded product. This 'folded and sealed' area, where the tube is required to be deformed in order to effect a seal, is an area of the injection-moulded tube particularly susceptible to stress and flex cracking.

The following examples illustrate the special problems of injection moulding such tubes. Tubes were injection moulded using DuPont 2020T polymer, a polymer DuPont describe as "especially suited for injection moulded closure and extruded tubing where flexibility and maximum resistance to environmental stress cracking is required". These tubes were moulded with extreme difficulty, requiring very high injection pressures and temperatures simply to get the 2020T to fill the mould. In each moulding significant degrees of core shifting/flexing were noted, due no doubt to the extremely high injection pressures that were required. In addition, it was noted that the tubes had virtually no resistance to flexing in the direction of the material flow, with significant cracking being induced with less than 5 manual squeezes of the tube. The environmental stress cracking of the same tubes was tested, and in spite of claims of "maximum resistance" to environmental stress cracking, was found to be totally inadequate for moulding thin-walled tubes by injection moulding.

In another illustration of the difficulty of injection moulding tubes, a Dow 'Dowlex' LLDPE pamphlet advises that LLDPE has substantially better ESCR properties than an equivalent high pressure LDPE. To illustrate the difference, the pamphlet states that in one comparative test a high Dow Dowlex LLDPE has an ESCR in oil some 80 times better than that achieved by a high pressure LDPE with the similar density and MFI (5700 hrs compared to 70 hrs). It further states that the LLDPE has an ESCR approximately 10 times better than the LDPE when immersed in a 10% Teric solution at 50° C. (225 hrs vs 26 hrs). However, contrary ro these observations, we have found that when these polymers are moulded in the form of thin-walled tubes and ESCR subsequently tested using a specially designed test method for assessing tube ESCR, both Dow's 'Dowlex' LLDPE 2517 and Kemcor's LD 8153 (a high pressure LDPE with similar MFI and density) performed poorly in 10% Teric N9 at 50° C., and both failed within 20 minutes—clearly indicating their unsuitability for tube manufacture by injection moulding. This poor result is illustrative of the highly unusual and difficult nature of manufacturing injection moulded thin-walled tubes acceptable to the market.

SUMMARY OF THE INVENTION

We have now found that it is possible to injection mould flexible thin-walled articles having relatively long thin-walled sections by selection of the polymers used in the injection moulding process having a time to failure of greater than 10 hours when tested according to the following procedure:

i) a plurality (preferably 6 or more) of strips of the polymer blend incorporating any post moulding treatment intended for the final article having cross-sectional dimensions of 0.65 mm in thickness and 10 mm in width are injection moulded under high shear, long flow length conditions, similar to those intended for use in the manufacture of the flexible thin-walled article.;

ii) the strips are bent back upon themselves and stapled 3 mm from the bend;

iii) the bent strips are immersed in a solution of a stress crack agent such as an ethoxylated nonylphenol, eg. a 10% solution of Teric N9 (nonylphenol ethoxylated with 9 moles of ethylene oxide—Orica Australia Pty Ltd) and held at a temperature of 50° C.;

iv) the strips are observed for signs of cracking; and v) the time to failure is when 50% of the strips show signs of cracking.

Any reference to "an ESCR" throughout the specification and claims which follow, unless specfically stated otherwise, refers to an ESCR determined using the above test procedure. Accordingly, the invention provides a process for the manufacture of thin-walled articles comprising the steps of:

1) selecting a polymer blend having an ESCR of greater than 10 hours;
2) melting the polymer blend;
3) ramming the molten polymer blend into a mould having a cavity which produces a thin-walled article having a thin section of 1 mm or less in thickness and wherein the thin section is substantially continuous for greater than 50 mm in the direction of flow of the molten polymer blend in the mould; and
4) removing from the mould the thin-walled article formed from the polymer blend.

By "substantially continuous", it will be understood by those skilled in the art that the thickness of the thin section is generally maintained at of 1 mm or less although some variation resulting in an increase in thickness is permitted, for example when an embossed, textured or relief finish is incorporated into that article. The thickness refers to the thickness of the layer of polymer blend described above and excludes any additional layers such as may be incorporated as a multilaminate. In applications where the blend is foamed we refer to the notional thickness of an unfoamed material which can be readily determined from the density of the polymer blend.

It will be understood that throughout the specification and claims which follow, the term "polymer blend" refers to compositions comprising at least one polymer and optionally incorporating additional components such as are described herein.

It will be understood that throughout the specification and claims which follow, the term "copolymer" refers to polymers incorporating two or more monomer units therein.

The polymer blends selected for the manufacture of flexible thin-walled articles according to the invention have an ESCR of greater than 10 hours. Preferably the ESCR of the polymer blend is greater than 100 hours, more preferably greater than 200 hours and most preferably greater than 360 hours. Where the flexible article is a tube or other container used for the packaging of a composition such as a moisturiser or a shampoo which may be quite aggressive to the thin walled article and result in a degradation of its properties over time, it is desirable to select a polymer blend having an ESCR sufficiently high such that the thin walled article formed from the blend is able to withstand the rigours of use despite any degradation of properties resulting from the aggressive nature of the materials contained within the thin-walled article. Where the thin-walled article is used for the packaging of a relatively inert material, a lower ESCR may be tolerated.

The ESCR test as hereinabove defined may be conducted using a variety of stress crack agents. The preferred stress crack agent is Teric N9, although other ethoxylates of nonylphenol may also advantageously be used. Other stress crack agents may also be used and may be selected based upon the desired end-use. For example, other stress crack agents may include mineral oils, cationic surfactants, solvents and other agents which will be apparent to those skilled in the art.

Advantageously, the ESCR test as described above is conducted under moulding conditions similar to those to be used in the manufacture of thin-walled articles. For example where it is intended to produce the thin-walled article using a moulding incorporating melt flow oscillation techniques, it is advantageous to conduct the ESCR tests on panels produced from mouldings made by employing melt flow oscillation techniques.

The ESCR test as described herein has allowed a variety of polymer blends to be identified which are able to be injection moulded to form thin-walled articles. In a second aspect of the present invention there is provided a process for injection moulding a thin-walled article comprising the steps of:

1) melting a polymer blend having an ESCR of greater than 10 hours, said polymer blend comprising at least one polymer and at least one compatible agent and/or at least one nucleating agent;
2) ramming the molten polymer blend into a mould said mould having a cavity which produces a thin-walled article having a thin section less than 1 mm in thickness and wherein the thin section is substantially continuous for greater than 50 mm in the direction of flow of the molten polymer blend in the mould; and
3) removing from the mould the thin-walled article formed from the polymer blend.

A wide variety of polymers may be used as the base of a blend which meets the ESCR test as hereinabove defined or acts as the at least one polymer in the second aspect of the present invention. These polymers include olefin homopolymers and copolymers, preferably ethylene or polypropylene homopolymers and copolymers with $C_3$–$C_{20}$ alpha or beta olefins and/or polyenes, preferably $C_3$–$C_x$ alpha or beta olefins, such polymers having densities ranging from very low to high density (density ranges between 0.85 and 0.97 g/cm$^3$). Also suitable for use in the present invention are ethylene, propylene and butene copolymers with terminal vinyl groups and ethylene, propylene and butene copolymers containing greater than 50% ethylene, propylene or butene which are copolymerised with comonomers such as methyl acrylates, ethyl acrylates, acrylic acid and methacrylic acid, ionomers, and styrene-ethylene/butene-styrene ABA copolymers. These polymers may be made by a wide variety of methods including high and low pressure processes, using a wide variety of catalysts such as Ziegler-Natta and metallocenes, and have molecular structures ranging from linear to highly branched, thus included are LDPE, MDPE ant HDPE. Particularly suitable for use in the present invention are plastomers, 'substantially linear' and branched polyethylenes or polypropylenes, copolymers of propylene and ethylene or one or more alpha-olefins, terpolymers of ethylene, propylene and one or more alpha-olefin (of which Montell's Catalloy polymers are an example) and polymers and copolymers of propylene manufactured using metallocene catalysts. Other polymors suitable for use in the present invention include polylactic acid polymers.

We have found that plastomers, 'substantially linear polyethylenes', metallocene branched polyethylene copolymers, propylene alpha-olefin interpolymers and metallocene propylene polymers and interpolymers are preferred for use in the present invention for the production of thin-walled products, and especially for the production of flexible tubes. A key characteristic of plastomers, 'substantially linear polyethylenes', metallocene branched polyethylene copolymers, propylene alpha-olefin interpolymers and metallocene propylene polymers and interpolymers is their composition distribution i.e. the uniformity of distribution of comonomer within and among the molecules of the polymer. Plastomers, 'substantially linear polyethylenes', metallocene branched polyethylene copolymers, propylene alpha-olefin interpolymers and metallocene propylene polymers and interpolymers are generally made using metallocene catalysts, which are known to incorporate comonomer very evenly among and along the polymer molecules they produce. Thus most molecules of a particular plastomer, 'substantially linear polyethylenes', metallocene branched polyethylene copolymers, propylene alpha-olefin interpolymers and metallocene propylene polymers and interpolymers will have roughly the same comonomer content, and within each molecule the comonomer will be super-randomly distributed. Ziegler-Natta catalysts generally yield copolymers having a considerably broader composition distribution—specifically the comonomer distribution in polymers thus produced will vary widely among the polymer molecules, and will also be less randomly distributed within a given molecule.

U.S. Pat. No. 5,451,450, the disclosures of which are herein incorporated by reference, describes plastomers as ethylene alpha-olefin copolymers (including ethylene/alpha-olefin/polyene copolymers) with a molecular weight distribution in a ratio $M_w/M_n$ range of 1.5–30, preferably in the range of 1.8–10 and more preferably in the range 2–4. Generally, plastomer polymers comprise ethylene homopolymers and interpolymers of ethylene, with at least one $C_3-C_{20}$ α-olefin copolymer being especially preferred. The term "interpolymer" is used herein to indicate a copolymer or a terpolymer or the like. That is, at least one other comonomer is copolymerised with ethylene to make the interpolymer. Generally the α-olefins suitable for copolymerisation with ethylene to form plastomers contain in the range of about 2 to about 20 carbon atoms, preferably in the range of about 3–16 carbons, most preferably in the range of about 3–8 carbon atoms. Illustrative non-limiting examples of such α-olefins are propylene, 1-butene, 1-pentene, 4-methyl-1-pentene, 1-hexene, 1-octene, and 1-dodecene and the like. Polyene comonomers suitable for the copolymerisation with ethylene to form plastomers suitable for the present invention have, in the main, about 3 to 20 carbon atoms, preferably in the range of about 4 to about 20 carbon atoms, most preferably in the range of about 4 to about 15 carbon atoms. In one embodiment the polyene is a diene that has in the range of about 3 to about 20 carbon atoms, and may be a straight chained, branched chained or cyclic hydrocarbon diene. Preferably the diene is a non-conjugated diene. Non-limiting examples of ethylene/alpha-olefin plastomers suitable for the present invention include ethylene/butane-1, ethylene/hexene-1, ethylene/octane-1 and ethylene/propylene copolymers. Non-limiting examples of terpolymer plastomers suitable for the present invention include ethylene/propylene/1,4 hexediene and ethylene/octene-1/1,4 hexediene.

Plastomers and 'substantially linear polyethylenes' are produced mainly with the use of metallocene catalysts. U.S. Pat. No. 5,281,679, the disclosures of which are herein incorporated by reference, shows a method of producing metallocene homo and copolymers with a broad molecular weight distribution, generally in the range of 3–30, which have improved tensile and impact strength relative to Ziegler-type catalysed polymers. They are also characterised by having considerably narrower short chain branching distributions, and lower hexane extractables. Such polymers are suitable for use in the present invention.

In germs of densities, the plastomers preferred for use in the process of the present invention are comparable to VLDPE or ULDPE, which are also copolymers of ethylene with α-olefins, such as butene, hexene or octene. They are generally defined as ethylene alpha-olefin copolymers with densities between 0.86 and about 0.915. The process for making VLDPEs is generally described in EP 120503. Plastomers, even those with the same density as VLDPEs, have greatly different physical properties due to differences in the manufacturing process—primarily in the use of metallocene catalysts. In general, a VLDPE compared to a plastomer of similar density has a significantly higher melting point and softening point, molecular weight/size distribution higher than 3 and a higher level of crystallinity.

Elastic substantially linear olefin polymers as disclosed in a number of patents including U.S. Pat. No. 5,272,236, U.S. Pat. No. 5,278,212, U.S. Pat. No. 5,380,810, U.S. Pat. No. 5,525,695 and U.S. Pat. No. 5,665,800 all of which are incorporated herein by reference. As an example of an elastic substantially linear olefin polymer, U.S. Pat. No. 5,578,272 describes one type as having have a critical shear rate at onset of surface melt fracture of at least 50% greater than the critical shear rate at onset of surface melt fracture of an olefin polymer having the same $I_2$ and $M_w/M_n$. These polymers also have a processing index (PI) less than or equal to a comparative linear olefin polymer ae the same I2 and $M_w/M_n$. Elastic substantially linear polymers comprising ethylene homopolymers and interpolymers of ethylene with at least one $C_3-C_{20}$ α-olefin copolymers are especially preferred. The term "interpolymer" is used herein to indicate a copolymer or a ter polymer or the like. That is, at least one other comonomer is copolymerised with ethylene to make the interpolymer.

The term 'substantially linear' polymers means that the polymer backbone is substituted with about 0.01 to about 3 long chain branches per 1000 carbons, most preferably 0.03 to 1 long chain branches per 1000 carbons. The term "linear olefin polymer" means that the polymer does not have long-chain branches, as for example the traditional linear low density polyethylene or linear high density polyethylene polymers made using Ziegler polymerisation processes (e.g. U.S. Pat. Nos. 4,076,698 and 3,645,992), the disclosures of which are incorporated herein by reference.

The SCBDI (short chain branch distribution index) is defined as the weight percent of molecules having a comonomer contem within 15% of the median total molar comonomer content. The SCBDI of the substantially linear polymers suitable for the present invention is preferably greater than about 30%, and especially greater than about 50%.

A unique characteristic of the mbstantially linear polymems of the present invention is a highly unexpected flow property where the $I_{10}/I_2$ value is essentially independent of polydispersity index (i.e. $M_w/M_n$). This is contrasted with conventional polyethylene resins having rheological properties such as the polydispersity index, the $I_{10}/I_2$, increases. The density of the ethylene or ethylene/α-olefin substantially linear olefin polymers in the present invention is generally from about 0.85 g/cm³ to about 0.97 g/cm³, preferably from about 0.85 to 0.92 g/cm³.

The substantially linear polymers preferred for use in the process of the present invention have processability substantially similar to that of high pressure LDPE, while possessing the strength and other physical properties similar to those of conventional LLDPE without the benefit of special adhesion promoters (e.g. processing additives such as Viton flouroelastomers made by DuPont).

U.S. Pat. No. 5,525,695 (the disclosures of which are herein incorporated by reference) describes a manufacturing method for 'substantially linear polyethylenes', and characterises them as having:

A. a density from about 0.85 g/cm$^3$ to about 0.97 g/cm$^3$;
B. an MI from 0.01 g/10 min to 1000 g/10 min;
C. and preferably a melt flow ratio of $I_{10}/I_2$ from about 7 to 20; and
D. a molecular weight distribution $M_w/M_n$ preferably less than 5, especially less than 3.5 and most preferably from about 1.5 to 2.5.

Elastic substandally linear olefin polymers can be made with broader molecular weight distributions by means of the appropriate selection of catalysts for the polymerisation process as described in U.S. Pat. No. 5,278,272. Broader MWD material exhibits a higher shear rate or shear stress dependency. In other words, generally the broader the MWD, the higher the effective MFI at high shear, and hence the better the processing characteristics. Broad molecular weight 'substantially linear olefin polymers', plastomers and metallocene branched polyethylenes are particularly suited to the production of tubes by the process of the present invention.

Further, we have found that some types of polymers, preferably unsaturated polymers such as polyvinyl chloride and polystyrene, more preferably polyolefins and even more preferably plastomers, 'substantially linear polyethylene', metallocene branched polyethylene and polypropylene copolymers and most preferably plastomers and 'substantially linear polyethylene' polymers and polypropylene copolymers having densities between 0.87 and 0.92 and MFIs above 10, preferably above 20 and most preferably above 30 may, with the addition only of nucleating agents as a means of improving the ESCR of the tubes, be used to produce tubes suitable for packaging some less aggressive products. However, the addition of comparible polymers such as polypropylene and polypropylene copolymers to such polymers in addition to the nucleating agents results in better overall ESCR resistance, and are generally preferred.

It has been established that polymers, but particularly plastomers and substantially linear olefins, having higher-than-normal $I_{10}/I_2$ values whuch are essentially independent of polydispersity index (i.e. $M_w/M_n$) and metallocene polypropylene homo and copolymers are particularly suited to the manufacture of injection moulded tubes and other thin-walled articles having good ESCR and other physical/chemical properties. As discussed in U.S. Pat. No. 5,281,679 the disclosures of which are incorporated herein by reference, broadening the molecular weight distribution of a polymer—and particularly polyethylene and its copolymers—increases the rensile strength and impact strength of products made therefrom. The main reason for high $I_{10}/I_2$ in a polymer is the presence of both high MW and low MW molecules in the polymer. It is believed that the high MW molecular fraction contribute significantly to improving the ESCR properties of the polymer, while the low MW molecular fraction contnbute to the improved processability of the polymer by increasing the shear sensitivity of the polymer, thereby enabling the polymer to be molded into tubes in spire of the apparently low MFI (usually measured as $I_2$) of the polymer.

High $I_{10}/I_2$ polymers suitable for the present invention may be produced by a variety of methods. These include:

1) intimately blending two or more polymers having different molecular weights in appropriate blending equipment;
2) producing bi or multi modal polymers with high $I_{10}/I_2$ by means of 'tandem' reactors; and
3) producing bi or muld modal polymers with high $I_{10}/I_2$ in a single reactor using appropriate catalysts.

The catalysts used to produce bi or multi modal polymers with high $I_{10}/I_2$ may be selected to produce:

1) broad molecular weight distribution polymers (ea. with molecular weight distribution in the 3–30 range as described in U.S. Pat. No. 5,281,679 which is incorporated herein by reference); or
2) effectively two or more polymers, each having either a narrow or broad molecular weight distribution as desired. U.S. Pat. No. 5,539,076 the disclosures of which are herein incorporated by reference, describes a method of manufacturing bi or multi modal polyethylene polymers with densities between 0.89 and 0.97 in a single reactor.

Other polymers suitable for injection mouiding tubes are silane-grafted or copolymerised polymers. Such polymers can be crosslinked post-processing, resulting in mouldable/processable, crosslinked polymer compounds which provide the ease of processability and design/process flexibility of relatively low viscosity polymers while achieving the strength and other benefits of higher viscosity, cross-linked polymers and copolymers. These polymers also eliminate the need for prolonged cycle times and elevated temperatures to achieve in-mould crosslinking. There are numerous patents describing various aspects of the method of preparing and crosslinking of various silane-based compositions that can be used in the present invention. Included are U.S. Pat. Nos. 5,055,249, 4,117,063, 4,111,195, 4,413,066, 4,975, 488 and 3,646,155, the disclosures of which are incorporated by reference.

In a further aspect of the present invention there is provided a compound in which all the ingredients can be mixed in a single step in an extruder immediately prior ro injection moulding. The compound consists of one or more polymer types, such as acrylates or branched metallocene-catalysed ethylene alpha-olefin plasromers which is reacted with an organosilane compound such as vinyl trimethoxy silane in the presence of a peroxide, such as dicumyi peroxide, to produce a silane-grafted polymer - this reactive processing taking place in the barrel of an injection moulder. Then, just prior to injecting the silane grafted polymer into a mould, a catalyst such as dibutyl tin dilaurate is introduced into the silane grafted polymer in the barrel of the moulder and mixed to ensure intimate mixing of the catalyst and the grafted polymer. The catalyst facilitates the post-moulding crosslinking of the silane components on the polymer backbone in the presence of moisture by means of condensing the hydrolysable silane groups on different polymer backbones, thus producing a new polymer which has properties that are a combination of the properties ofrhe individual polymers from which the silane-grafted polymers have been produced as well as the properties conferred by the higher molecular weight polymer molecules that result from the above crosslinlcing. The final properries of the new polymer can be varied by changing the proportions of the various polymers, varying the nature of either or both polymers (ea. by using polymers with additional fictional groups such as vinyl acetate and/or varying the properties of the silane-containing polymer by, for example, changing the type of polyethylene and/or silane type chemically bound to a polymer). The final properties can further be changed by the addition of other compounds/additives such as fillers, plasticisers and antioxidants that are well known to anyone practiced in the art of polymer compounding.

An alternative method of producing silane grafted polymers suitable for use in the present invention is to graft the silane onto the polymer in the presence of a peroxide or other free radical generator in a suitable reactor, such as an extruder as a separate step, and to package the resultant grafted polymer in moisture proof packaging for subsequent use. When desired, the grafted polymer may be introduced into the injection moulder together with a suitable amount of a condensation catalyst, the two components being intimately blended together in the moulder, and then injection moulded and cross-linked post-processing.

The silane-containing polymer typically contains between 0.1 and 15% of hydrolysable silane. The most common hydrolysable silanes used in the production of silane-containing polymers are vinyltrimethoxysilane, vinyltriethoxysilane, but can be any hydrolysable silane that can be incorporated into another polymer to form a silane-containing polymer.

The at least one compatible agent is preferably a polymer and when blended with the at least one polymer results in blends having properties which, when blended is used to mould thin-walled articles such as flexible injection moulded tubes, are superior to the original constituents or the neat polymers. The at least one compatible agent may be selected from the group consisting of ethylene vinyl acetate; ethylene vinyl alcohol; plasticised polyvinyl acetate and polyvinyl alcohol; alkyl carboxyl substituted polyolefins; copolymers of anhydrides of organic acids; epoxy group containing copolymers; chlorinated polyethylene; ethylene-propylene-butylene etc. copolymers; ultra low density, very low density, low density, medium density and high density polyethylene; polypropylene, polybutylene and copolymers thereof; polyester esters; polyether-esters (such as DuPont's Hytrel range); acrylonitrile-methacrylate copolymers; block copolymers having syrene end blocks; half esters; amino and alkoxysilane grafted polyethylenes; vinyl addition polymers; syrene butadiene block copolymers; acid grafted polyolefins; vinyl pyrrolidine grafted polyolefins; block copolymers of dihydric monomers; propylene graft unsaturated esters; modified polyolefins comprising amide, epoxy, hydroxy or $C_2-C_6$ acyloxy functional groups other polymeric compatibilisers suitable for use with polyolefins; particles coated with any of the above; and mixtures thereof. In the above compatible agents the functional groups are generally incorporated into the modified polyolefin as part of an unsaturated monomer which is either copolymerised with an olefin monomer or grafted onto a polyolefin to form the modified polyolefin.

Alkyl carboxyl substituted polyolefins may include substituted polyolefins where the carboxyl groups are derived from acids, esters, anhydrides and salts thereof. Carboxylic salts include neutralised carboxylic acids and are often referred to as ionomers (ea. Surlyn). Typically acids, anhydrides and esters include methacrylic acid, acrylic acid, ethacrylic acid, glysidyl maleate, 2-hydroxyacrylate, diethyl maleate, maleic anhydride, maleic acid, esters of dicarboxylic acids, etc. Preferred examples include ethylenically unsaturated carboxylic acid copolymers such as polyethylene methacrylic acid and polyethylene acrylic acid and salts thereof.

Copolymers of anhydrides of organic acids include copolymerb of maleic anhydride as well as copolymers of cyclic anhydrides.

Poly-2-oxazoline compounds and fluoroelastomers are also suited for use as compatible agents. Incorporation of 1–40%, most preferably 2–20% of poly-2-oxazoline compounds is preferred. These compatible agents improve the adhesion of the PE blend to various substrates, which may make them useful for printing or labelling. The compatibilizing agent comprises an alpha-olefin copolymer substrare grafted with amounts of monovinylidene aromatic polymer. Preferably, the alpha-olefin copolymer substrate is a terpolymer of ethylene, propylene and a non-conjugated diolefin.

Many copolymers of ethylene are also useful as compatible agents in the process of the present invention. For example single sire catalysed polymers such a metallocene catalysed polyethylene may be used as comparible agents in the present invention.

Polypropylene suitable as compatible agents for use in the process of the present invention may include isotactic, sydiotactic and attactic polypropylone and syndiotactic polypropylene of various MFIs, densities and crystallinities as would produce desired properties in products moulded by the process of the present invention. Particularly when blended with low molecular weight plastomers, a wide variety of polypropylene polymers possessing a very wide range of MFIs (1–200+), densities and crystallinities will produce blends suitable for use in the process of the present invention.

Polyethylene suitable as compatible agents for use in the process of the present invention may include polyethylenes of various MFIs, densities and crystallinities as would produce desired properties in products moulded by the process of the present invention. Included are very low, low, medium and high density polyethylene, particularly when blended with low molecular weight plastomers, substantially linear polyethylenes, and metallocene branched polyethylene polymers. A wide variery of polyethylene polymers possessing a very wide range of MFIs (1–200+), densines and crystallinities will produce blends suitable for use in the process of the present invention.

Many monomers have been copolymerized with propylene to form copolymers of propylene. Many of these copolymers are suitable as compatible agents for use in the present invention. Examples of ethylene-propylene copolymers include Montell's SMD6100P, XMA6170P. Further examples of polypropylene copolymers are Montell's Catalloy KS-084P and KS-357P—these products are believed to be terpolymers of propylene, ethylene and butene. Other such copolymers and/or terpolymers may be used.

Ionomers provide particular advantages as compatible agents when combined with plastomers, substantially linear polyethylene, and branched polyethylenes as the at least one polymer Ionomers are typically copolymers of ethylene and acrylic or methacrylic acids which have been neutralised with metal ions such as sodium, lithium or zinc. One group of ethylene copolymers, called ionomers, are exemplified by the commercial product Surlyn (manufactured by DuPont). Ionomers tend to behave similarly to cross linked polymers at ambient temperature, by being stiff and tough, yet they can be processed at elevated temperatures. The blend of plastomer and ionomer is particularly preferred, such blends provide polymers with increased barrier properties.

The block copolymers of dihydric monomers may include block copolymers of dihydric phenol monomers, a carbamate precursor and a polypropylene oxide resin.

The compatible agent is used in an amount at least sufficient to improve the environmental stress crack resistance of the polymer blend. Standard tests for environmental stress crack resistance are of little value in determining how particular polymer blends will perform in rhe manufacture of thin walled articles such as tubes. While not wishing to be bound by theory it is believed that the injection moulding of thin walled articles such as tubes introduces and freezes unique stresses into mouldings. The degree and orientation of stresses in articles such as injection moulded tubes result in their susceptibility to environmental stress cracking. Accordingly, in order to demonstrate the improvement in environmental stress crack resistance resulting from the present invention, the rest hereinabove described was developed In certain formulations, 2% or less of comparable agent is sufficient to improve the environmental stress crack resistance of the polymer blend relative to the environmental stress crack resistance of the plastomer.

The compatible agent may also be used in amounts in excess of those required to compatiblise the polymer blend in order to improve the viscosity characteristics of said polymer blend so as to optimise the moulding characteristics of said polymer blend and/or general properties of the moulded product such as softness and flexibility. Typically, the compatible agent is used in an amount of from about 2 to about 98 weight percent of the polymer blend, although lower amounts may be used in certain polymer blends. The optimum amount for a specific formulation will depend on the properties required and can be determined by experimentation. Further it has been found that inclusion of percentages of compatible agent that are greater than necessary for increasing the environmental stress crack resistance of the polymer blend will often also enable the improvement of the polymer blend properties such as tear and impact strength, barrier properties, chemical resistance, processing and product feel. For example, the incorporation of greater than necessary percentages of polypropylene to improve the environmental stress crack resistance of a polyethylene blend to the desired level may improve the chemical resistance and reduce the water vapour and water transmission ratio of the polymer blend compared to polymer blends containing the minimum amount of polypropylene required to improve the environmental stress crack resistance only. Further, it has been found that the inclusion of greater than necessary percentages of compatible agent may enable the incorporation of greater percentages of other polymers than would otherwise be consistent with this invention. Thus, using the compatible agent in such quantities may enable the incorporation of greater-than-otherwise-possible amounrs of such beneficial, essentially incompatible other polymers such as nylons and EVOH—with concomitant improvements in properties such as tear and impact strength, barrier properties, chemical resistance and product feel.

Barrier resins may be incorporated into the polymer blends of the present invention. Barrier resins that may be compatibilised with the at least one polymer include: condensation polymers such as polyamides, polycarbonates and various esters such as polyethylene terephthalate (PET), polybutylene terephthalate (PBT), polyethylene naphthalate (PEN); polyvinylchloride (PVC); polyvinylidene chloride (PVDC); ethylene vinyl alcohol (EVOH); polyvinyl alcohol (PVOH); ethylene vinyl acernre (EVA); EMA, EMAA, EEA; ionomers; monovinylidine aromatic polymers and copolymers; ethylene, propylene and buylene copolymers; chlorosulfated polyethylene, polyisoprene and polychloroprene, polyalkalenephenylene ester and ester ether; phenylfomaldehyde; polyacrylate; polyester ethers; acrylonitrile-methacrylate copolymers; nitrile copolymers; polyacrylonitale; polyurethane and polyaceyls. It will be appreciated thar certain barrier polymers will be more or less compatible with the at least one polymer than others. For example, EVOH with a sufficiently high ethylene content will be compatible with the at least one polymer, particularly wherein said polymer is an ethylene copolyoner such as a plastomer, while EVOH with a relatively low ethylene content will be essentially incompatible. Barrier properties of the polymer blends of the present invention may be further enhanced by the addition of additives capable of reacting with or absorbing deleterious chemicals such as oxygen and other gases.

The polymer blend may also incorporate a variety of other additives. Examples of additional additives include further polymers, pigments, dyes, fillers, antioxidants, plasticisers, UV protection, viscosity modifying agents, additives capable of reacting with or absorbing deleterious chemicals such as oxygen and other mould release agents and melt strength modifiers amongst others. These additives may be added to one or more components of the polymer blend or the polymer blend as a whole prior to moulding in order to modify its properties to suit specific applications or to achieve specific effects in the end product.

In order to obtain the desirable barrier properties using an essentially incompatible polymer and without preorientation of the polymers prior to injection moulding it is preferred that the melt flow index of the disperse phase should be somewhat greater than the melt flow index of the continuous phase ar the same shear rate. In particular, the barrier resin (usually the disperse phase) preferably has a melt flow index in the range of from 1.1 to 3.5 times greater than the melt flow index of the continuous phase. For optimum barrier properties it is believed that the disperse phase droplets should distort to form sheets (lamella structures) when subjected to stresses inherent in the injection process. However, if the melt flow index of the disperse phase is much lower than that of the continuous phase the droplets of disperse phase will tend to resist distortion and not form the lamellar structure desired for optimum barrier properties. On the other hand, if the melt flow index of the disperse phase is greater than that of the continuous phase it will have a greater tendency to break up under thc sheer stress of mixing thereby leading to a finer dispersion and hence smaller sheers of barrier material, thus reducing barrier performance. It is also preferred that the polymer blend, including the barrier polymer, be subjected to no more mixing prior to moulding than is necessary to obtain even mixing. Excessive sheering may result in reduced barrier properties. The person skilled in the art will be able to determine the desired amounts of mixing necessary to obtain the optimum balance of properties. A further advantage of the formation of these lamellar structures in polymer blends of the present invention is the ability to design the mould in order to facilitate flow of the molten polymer across the mould as well as directly down the core. It is believed the such a mould design facilitates biaxial stretching of the barrier materials to form lamellar structures, which further improve the barrier properties of the moulded articles.

Another method in which a lamellar/multilayer structure of polymers may be promoted for use in the present invenrion is by prearrangement of the polymers of the blend into a composite stream and injecting said stream into the mould for form articles consisting of largely discrete, generally planar and parallel layers. This may be achieved in a number of ways, including the coextension of a composite stream of discrete, generally planar and parallel layers of the various polymer components of the blends of the present invention, if necessary manipulating this composite stream to form a second composite stream having an increased number of layers of substantially uniform thickness, and then directly injection moulding the final stream so as to form a multilayer plastic article.

In a particularly preferred embodiment of the present invention, the polymer blend comprises at least one plastomer and at least one ionomer. These polymer blends may advantageously incorporate further polymer to impart barrier properties to the blend. For example, the incorporation of nylon in such a blend and selecting appropriate blending and moulding conditions substantially reduces the hydrocarbon and gas permeability of the plastomer. The high degree of directional orientation caused by the moulding process is believed to contribute to the imparting of the highly desirable barrier properties able to be introduced by the addition of nylon and other essentially incompatible polymers. Nylon itself must be stretched and oriented to form lamellar structures in order to optimise barrier properties. By incorporating aylon into the blend of plastomer and ionomer the blend may be injection moulded to form components having barrier properties which are believed to have been derived from the nylon while retaining resistance to environmental stress cracking.

While not wishing to be bound by theory, we have found that the at least one polymer appears to have the property of being able to interact with the at least one compatible agent whereby he properties of both the at least one polymer and the at least one compatible agent are significantly and unexpectedly changed to enable the polymer blend thus produced to be suitable for the producdon of thin-walled articles.

It is believed that the interaction between the at least one polymer and the at least one compatible agent forms regions within the moulded articles which can be regarded as "joints". These "joints" appear to absorb or disperse stresses in articles made from the polymer blend. The presence of these "joints" interspersed within the article appear to absorb or dissipate the stress which would otherwise result decreased physical properties. It is believed that these so called "joints" result from one or more of the following mechanisms:

(i) the polymer and the compatible agent interact, resulting in an increase in the number of amorphous areas within the polymer;

(ii) the interaction between the polymer and the compatible agent results in significant localised reduction in crystalliniry, ie. relatively amorphous regions, at the interface between the polymer and the compatible agent; and (iii) interaction between the polymer and the compatible agent which, while not resulting in reduced crystallinity and hence more amorphous regions, nevertheless produces a region at the interface between the polymer and compatible agent which has a greater ability to absorb or disperse stresses.

In particular it has been found that when the at least one polymer is an ethylene homo or copolymer, and preferably a plastomer or substantially linear polyethylene, said polymer is able to interact with propylene and many of its copolymers, and in doing so the crystallinity of said polymer is reduced. It is believed that the propylene polymers act as crystallising agents for the at least one polymer and in doing so increases the number of amorphous regions within the at least one polymer. DSC analysis shows that they also act to significantly reduce the overall crystallinity of the ethylene polymer, and particularly plastomers and substantially linear polyethylene polymers. It is further believed that these amorphous regions, together with the effects of the interfaces between the at least one polymer and the propylene polymer act to reduce or disperse the moulded-in stresses in the moulded part, thus increasing its ESCR. At the same ume, salt at least one polymer interacts with the at least one plastomer or substantially linear polyethylene and in doing so significantly reduces the crystallinity of the at least one plastomer.

It is believed thar many of the polymer blends form a co-continuous lamellar structure and that the interface between the at least one polymer and the at least one compatible agent is charactensed by an intimate intermingling of the at least one polymer and the at least one compatible agent at a microscopic level. In other words, it is believed that the at least one compatible agent acts as an interacting filler. It is believed that, because of this inrimate intermingling between the at least one polymer and the at least one compatible agent the overall properties of the polymer blend are improved. Particularly when low molecular weight plastomers and substantially linear polyethylenes are the at least one polymer, orher polymers previously regarded as substantially incompatible with polyethylene may now be compatibilised and blends thereof possess a range of properties which enables the commercially acceptable production of articles not hithertofore commercially viable.

It has been found that many compounds known to be capable of nucleating the crystallisation of polymers, particularly olefin polymers and copolymers and especially ethylene polymers and copolymers, improve the ESCR properties of polymers for use in the present invention. Depending on the nature of the individual polymer(s), nucleating agents alone (i.e., without the addition of compatible agents) are capable of increasing the ESCR of the polymer(s) to a level that enables said polymer(s) to be useful for the manufacture of injection moulded tubes. It is believed that nucleating agents increase the ESCR of polymers in tube manufacture by causing the formation of a greater number of small crystals than would otherwise be the case. These greater number of small crystals result in an increase in the number of amorphous areas within the polymer which are capable of absorbing or dispersing stresses introduced into the tube mouldings during injection moulding—thus increasing the ESCR and flex resistance of the product. Suitable nucleating compounds for use in tube manufacture include inorganic compounds such as talc, mica, compounds of various metals such as oxides and silicate as well as various organic compounds, including various dyes and pigments. However, for the most beneficial results when injection moulding tubes it is preferred that nucleating agents are used in conjunction with compatible polymers.

It has been found that compounds known to be capable of reducing the glass transition temperature ($T_g$) of the at least one polymer of the present invention, particularly olefin polymers and copolymers and especially ethylene polymers and copolymers, improve r the ESCR properties of polymers for use in the present invention. Depending on the nature of the individual polymer(s), $T_g$-reducing agents alone (ie. without the addition of compatible agents, nucleating agents or "high thermal density agents") are capable of increasing the ESCR of the polymers) to a level that enables said polymer(s) to be useful for the manufacture of injection moulded tubes. It is believed that $T_g$-reducing agents increase the ESCR of polymers in tube manufacture by effectively increasing the time that the polymer takes to coll down to its crystalline state, thus increasing the amount of time available for the polymer molecules to rearrange themselves so as to reduce the moulded-in stresses. This results in the moulded part having lower moulded-in stresses than would the case if its $T_g$ had not been reduced, thus resulting in the moulded product having a better ESCR. A suitable $T_g$-reducing agent is polypropylene. However, for the most beneficial results when injection moulding tubes it is preferred that $T_g$-reducing agents are used in conjunction with compatible agents, unless the $T_g$-reducing agent is in itself a compatible agent.

Poly-2-oxazoline compounds and fluoroelastomers are also suitable for use as compatible polymers. Incorporation of 1–40%, most preferably 2–20% of poly-2-oxazoline compounds improves the ESCR of polymers (see U.S. Pat. No. 4,474,928). These compatible polymers also improve the adhesion of the PE blend to various substrates, which may make them useful for preparation of the PE for printing or labelling.

Although the improved ESCR effects of additives such as nucleating agents and $T_g$ reducing agents may not be particularly noticeable in 'normal' mouldings, it is believed that in mouldings such as thin walled tubes—in which the polymer is subjected to fast cooling rates, high injection speeds, high injection pressures, long, narrow flow paths and radii, (and resultant high levels of induces stresses)—the effects can be significant even at low levels of additive addition. It has been found tbat such additives may improve the ESCR of certain polymers to the extent that the at least one polymer and sufficient amount of additive alone may be suitable for the production of injection moulded.

According to a further embodiment of the present inveneion, the at lease one compatible agent may be incorporated into the at least one polymer. For instance, a polymer having monomers incorporating compatibiliser groups may be copolymerised with other monomers to form a compatibilised polymer. For example, a monomer having a methacrylic acid group may be added to the polymerisation mixture of the at least one polymer to form a compatibilised plastomer. Alternatively, a compatibiliser group may be grafted onto the polymer. Advantageously, the polymer onto which a combatibiliser group is grafted is a plastomer or a substantially linear polyethylene.

The polymer blend may be prepared by extrusion of some or all of the components of ehe polymer blend and the resulting chopped extrusion used in the injection moulding process of the present invention. Alternatively, the polymer blend may be provided in its component form and subjected to mixing before and during the melting of the polymer blend in the present process.

The polymer blend may be melted by any convenient means. It is particularly convenient that the polymer blend be melted in a conventional injection moulding machine where a screw rotating in a heated barrel both melts the polymer blend and rams the molten polymer blend into the mould. The articles formed from the polymer blend may be readily removed from the mould by convenient means.

The injection moulding process of the present invention makes it possible to produce injection moulded articles having surprisingly thin sections while reraining the mechanical properties of the polymer blend. We have found that articles having cross-sections as thin as 0.3 mm to 0.7 mm may be injection moulded, such thin walled articles may have thin walls over 50 mm in length. These articles may be readily produced without substantial deterioration of the mechanical properties of the plastics material.

The polymer blends of the present invention which permit the injection moulding of articles having thin sections provides a number of advantages which have been hithertofore unattainable due to technical constraints. These technical constraints are best illustrated in the manufacture of thin walled tubes. These tubes, which are very commercially important, are extruded and therefore preclude the use of control and variation in wall thickness to permit the manufacture of tubes having controlled and variable wall thickness. The present invention provides for the manufacture of articles having thin sections where the thin sections are capable of controlled and varied thickness. For example, in the embodiment of an injection moulded tube the thickness of the walls of the tube may be varied along its length. The wall thickness may be greater at the neck of the tube, thereby allowing increased flexibility towards the tail. The present invention also allows the incorporation of embossing onto the thin walls of the tube. The embossing may take the form of corporate logos, trademarks, various text, as well as textures or surface finishes such as a leather grain or ripples.

A further advantage of the present invention which has been hithertofore unattainable due to technical constraints is the use of 'in-mould' labelling for decorating thin-walled tubes. Extruded tubes cannot be decorated by in-mould labelling, which therefore requires that any labelling of such tubes be carried out as a separate and expensive manufacturing operation. Tubes produced by the present invention can be in-mould labelled during the one-step moulding process, thereby avoiding the separate and expensive additional manufacturing operation. The placement of the labels into the cavity can be achieved by a variety of means, including placing the label on the core when the mould is open, closing the mould and transferring the label from the core to the cavity via a variety of means just prior the injection of the polymer to form an in-mould labelled tube.

A further advantage of the present invention is the ability to apply a barrier sheath to all or part of the core prior to moulding said barrier sheath which is transferred to the moulded article during the moulding process to confer improved barrier or other beneficial properties to tubes produced by the present invention. A further advantage of the present invention is the ability to apply a coating to either or both the core and cavity of the mould prior to moulding and which is subsequently transferred during the moulding process to relevant surface of the moulded article. This process results in a coating to either the external or internal surface of the tubes produced by the present invention. Such coatings may have a variety of functions, including decorative or barrier.

The present invention which enables the injection moulding of thin walled articles also provides for many variations in the shape and configuration of articles which have hithertofore been restricted due to technical difficulties in manufacturing thin walled articles. Again, with reference to the thin walled tube example a variety of closures, hooks or flaps may be incorporated into the design. Hithertofore the incorporation of such additional components would require separate components to be manufactured and subsequently welded or otherwise attached to the tubes, adding significantly to the total cost of the tube. In accordance with the present invention, the use of appropriately tool designs and/or dual injection moulding equipment permits the one-step manufacture of tubes having integral closures, hooks, flaps or other appendages formed from the same or different polymers.

A number of modifications may be made to standard tube tooling to facilitate the manufacture of unitary tube/appendage mouldings, in particular unitary tube/closure mouldings. Such unitary tube/closure mouldings can have, if desired. a wide variety of moulded-in hinges (including living hinges), dispensing spouts and other convenience features either moulded in during the moulding process. In cases where the polymer is used to mould the unitary tube/closure is insufficiently stiff to allow for the moulding of a conventional hinge with 'self-closing' or 'flip' mechanism, the hinge itself may be constructed with a radius. Provided the polymer has sufficient elasticity, the radius combined with the elasticity of the polymer should result in a self-flipping feature for the closure.

An additional advantage of the process of the present invention is that by enabling the production of tubes with special contours designed to receive attachments, it enables the relatively inexpensive and easy attachment of convenience features such as self-sealing valves. A typical tube/self-sealing closure combination consists of at least four and often five individual components—a two-part tube (tube body and head/shoulder), a closure body, a self-sealing valve, a retaining device for securing the valve to the body and often a protector for the valve to prevent discharge of the contents, particularly during packing and delivery to retail outlets. The at least three part self-sealing closure is assembled separately and then attached to the tube. The process of the present invention permits the production of a one-part tube/valve receptor/flip-top protector to which the valve and retaining device can be easily attached. This reduces the number of parts required to be produced as well as the complexity and number of steps of the assembly process. This significantly reduces the cost of such rube/closures.

In a further embodiment, the use of the at least one compatible polymer in accordance with the present invention permits the manufacture of articles such as tubes may have protective or barrier coatings directly applied onto the internal and/or external thin walled sections without the need for pretreatment such as corona discharge or flame treatment. For example, the incorporation of polyoxazoline compounds may improve the adhesion of lacquers and varnishes to the extent of eliminating the need for such pretreatment. This may be of particular advantage for containers for food use or for containing substances which require specific coatings for their containment. Alternatively, suitable barrier and other coatings may be applied by conventional means such as dipping, spraying, printing, vapour or vacuum deposition, this latter process being particularly useful for the application of especially high barrier materials such as metallic or non-metallic oxides/nitrides (eg silicone oxide) or fluorine as well as carbon and/or organic radicals with useful properties. In addition, some coatings, such as coatings produced by reaction of the tube polymer with fluorine, may be further reacted with monomers containing various beneficial functional groups to further enhance the properties of the coatings. For example, hydroxyl-containing monomers may be reacted with a fluoridated polyethylene coating to produce a hydroxyl-containing coating.

By their nature, tubes have thin, soft and flexible walls. This lack of rigidity in the moulded tube makes it difficult to eject the moulded part from the core of the mould by normal mechanical means common in injection and compression moulding and processes such as stripper plates and injector pins, without causing potential damage to the mouldings. A further disadvantage is the slow ejection rates often necessary to minimise the chances of damage to the tube on ejection.

We have found that using compressed gas to assist with the ejection minimises the potential for damage to the tube on ejection, and also allows for rapid ejection. When the tube has been formed in the mould cavity and has set sufficiently for the tube to be retrieved from the mould cavity, the male and female part of the mould are separated by telescopically sliding the male core part out of the female part. At the same time, or subsequently, the moulded tube can be separated by injecting compressed gas from within the male core part and to allow compressed air to communicate with the inside surface of the end part of the moulded tube, most preferably by lifting the tip of the core off the main section of the core just prior to the injecting of air in order to break the seal that often exists between the moulded tube and the core to facilitate easier removal of the moulded tube. This lifting of the tip as well as pressurisation beneath the end part will enable the moulded tube and the male core part to be separated by relative sliding movement of the moulded tube over the tip of male core part. To assist separation, the male core part may have a very slightly tampered outside surface, so the diameter of the male core part is greater at the end of the tube remote from the end portion.

Also, the outside surface of the male core part may be formed or treated so as to have a slight degree of surface roughness sufficient to inhibit formation of a vacuum seal between the moulded portion and the male core part during the introduction of the pressurised gas. That is, the degree of surface roughness will allow pressurised air to flow along the outside surface of the make core part and expand the moulded tube slightly to separate tube from the core.

In a further improvement to assist removal of the moulded part from the cavity, compressed gas can be injected into the mould just prior to or during the separation of the core from the cavity in such a way that the gas flows between the outer surface of the moulded part and the interior surface of the cavity, thus assisting the separation of the moulded part from the cavity and its subsequent removal from the cavity while on the core of the mould.

To assist in the polymer to flow more easily into the cavity to form the thin-walled article during the injection process, a vacuum may be applied to the cavity just prior to and during the injection of the polymer. Mould filling may be further assisted by balancing polymer flow within the mould by cutting longitudinal and/or lateral grooves in either or both the core cavity to direct and/or speed said polymer flow to selected areas within the mould.

The present invention also allows the use of expandable cores in the mould which facilitates the release of the thin walled article from the mould and also allow the production of thin walled containers having wide sections adjacent the head and shoulder region in a manner hitherto not possible.

The present invention will be further described by the following non-limiting examples and drawings.

DESCRIPTION OF THE FIGURES

FIG. 1 is a view of a thin-walled container made from the polymer blend of the present invention.

FIG. 2 is a view of a thin-walled container made from the polymer blend of the present invention.

FIG. 7 is a view of a thin-walled container made from the polymer blend of the present invention incorporating a hook adapted to hang the container from a hook or hanger, at a point of sale.

FIG. 8 is a cut away view of a thin-walled container made from the polymer blend of the present invention incorporating a barrier coating on the inside of the container.

DETAILED DESCRIPTION OF THE PREFERRED EMBODIMENTS

Figure 4:
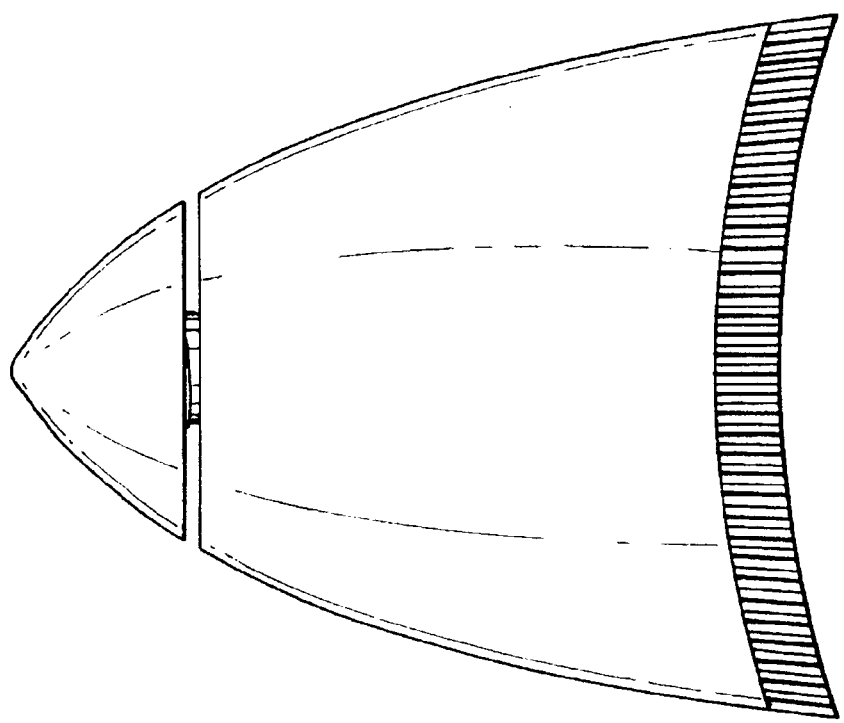
FIG. 4 is a view of a thin-walled container made from the polymer blend of the present invention.
Figure 3:
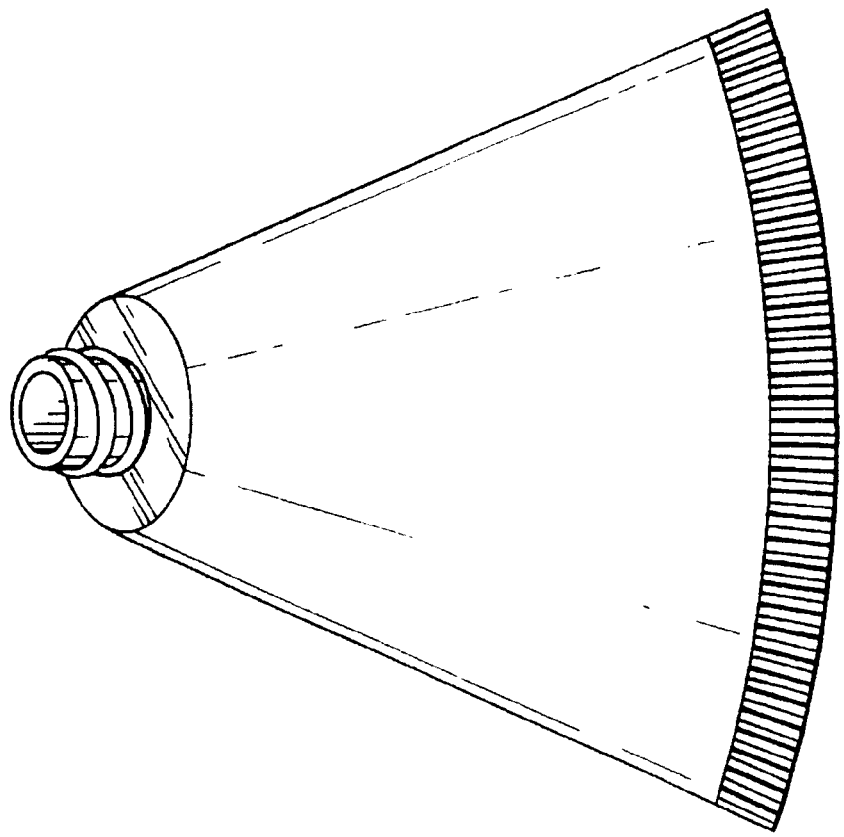
FIG. 3 is a view of a thin-walled container made from the polymer blend of the present invention.
Figure 6:
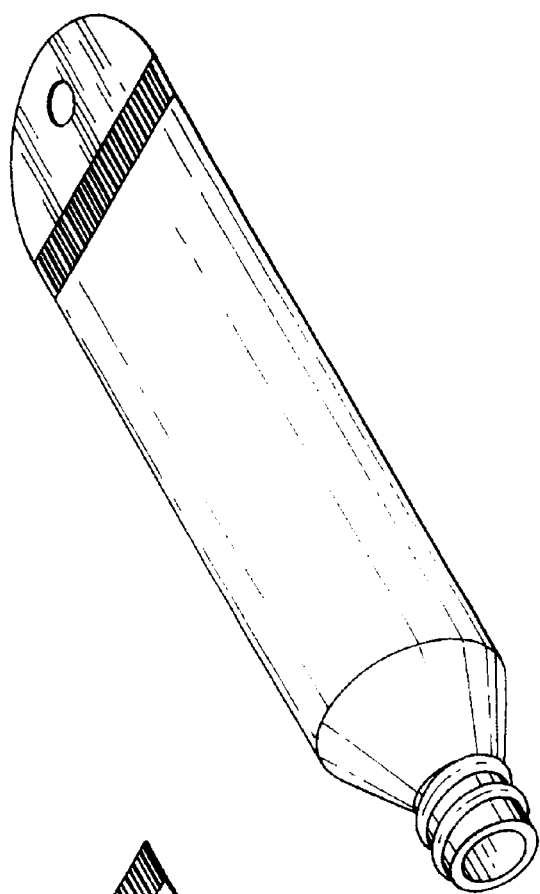
FIG. 6 is a view of a thin-walled container made from the polymer blond of the present invention incorporating a flange with a hole adapted to hang the container from a hook or hanger, at a point of sale.
Figure 5:
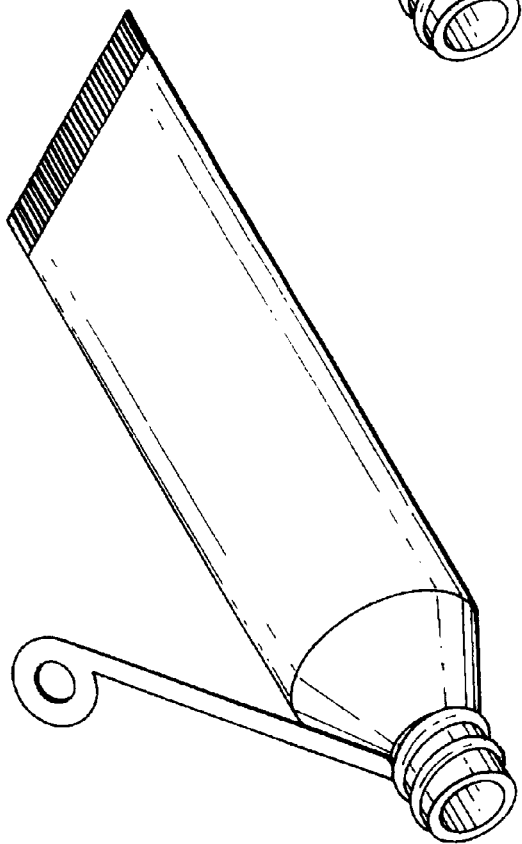
FIG. 5 is a view of a thin-walled container made from the polymer blend of the present invention incorporating a hook integrally moulded with the container. The hook may conveniently be replaced with a spreader or other desirable tool of convenience.
Figure 9:
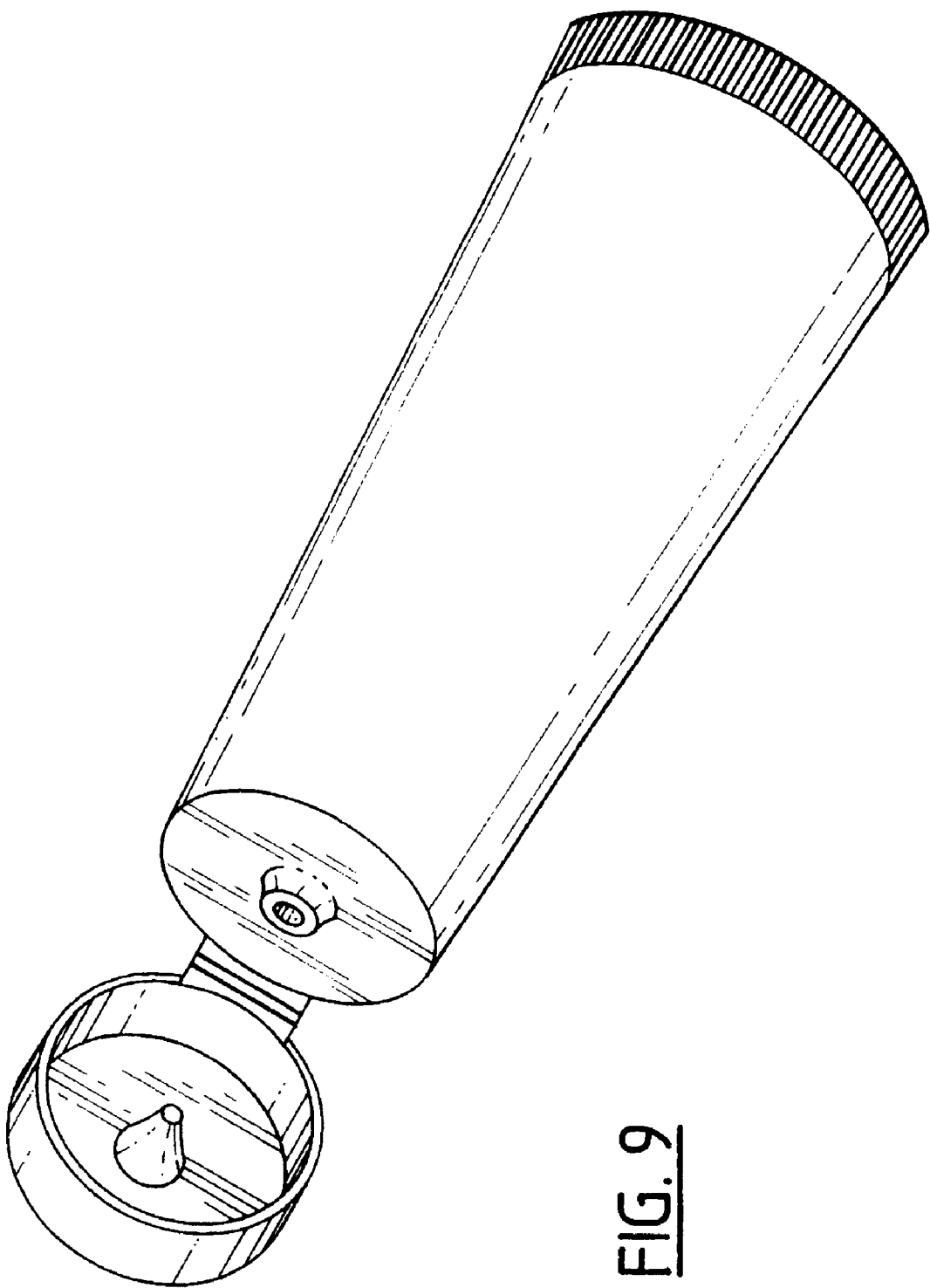
FIG. 9 is a view of a unitary tube/enclosure.
Figure 10B:
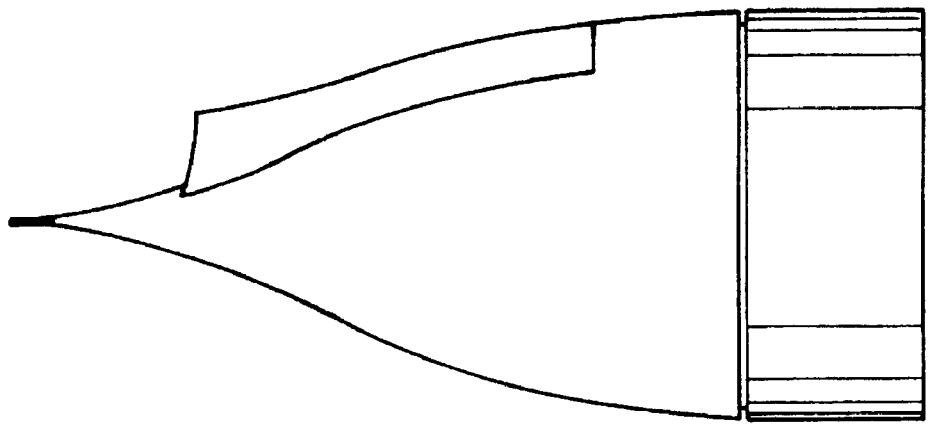
FIGS. 10(a) and 10(b) are views of a tube with a side-pouch for receiving item such as product samples, toothbrushes or combs.
Figure 10A:
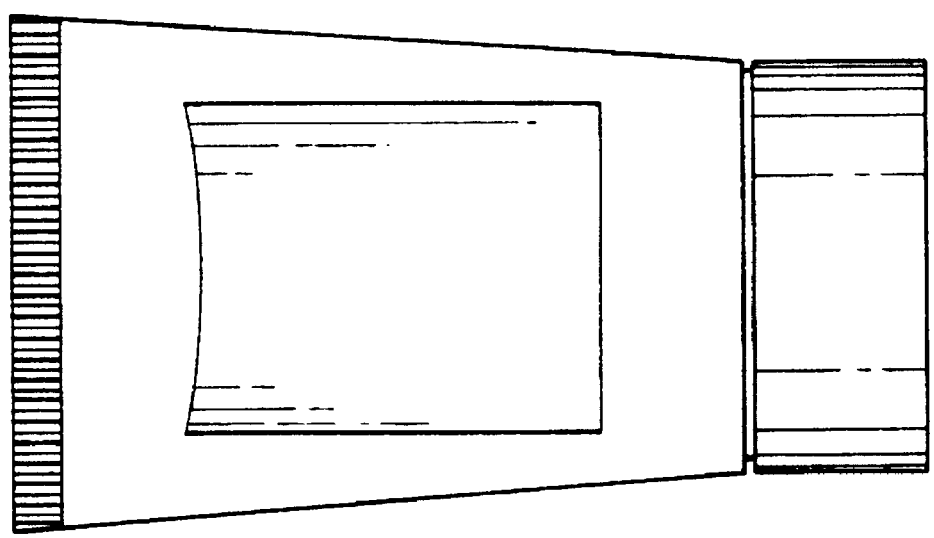
Figure 11A:
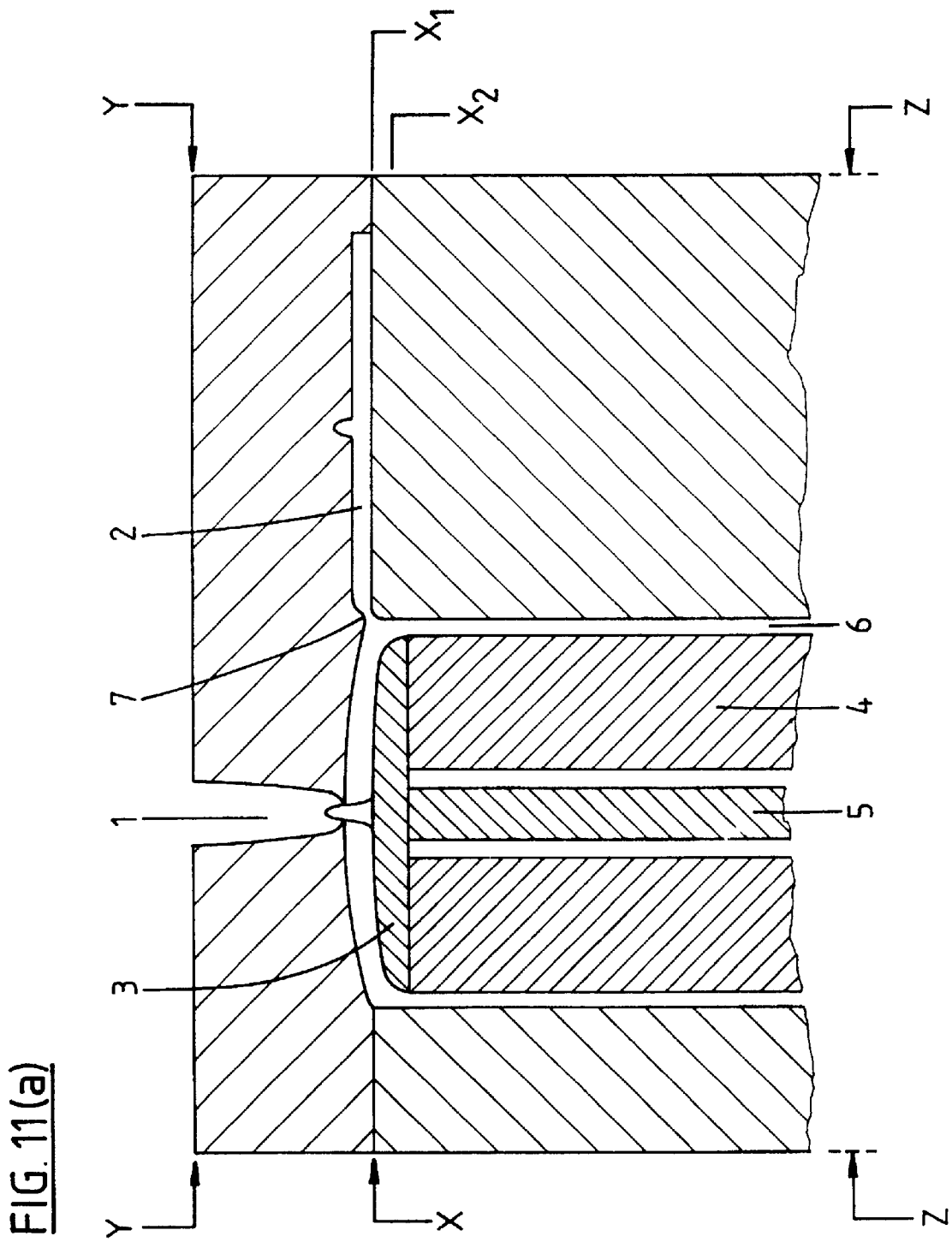
FIGS. 11(a)–14 show detail of some support mechanisms for unitary tube/appendages, and in particular, unitary tube/closures.
Figure 11B:
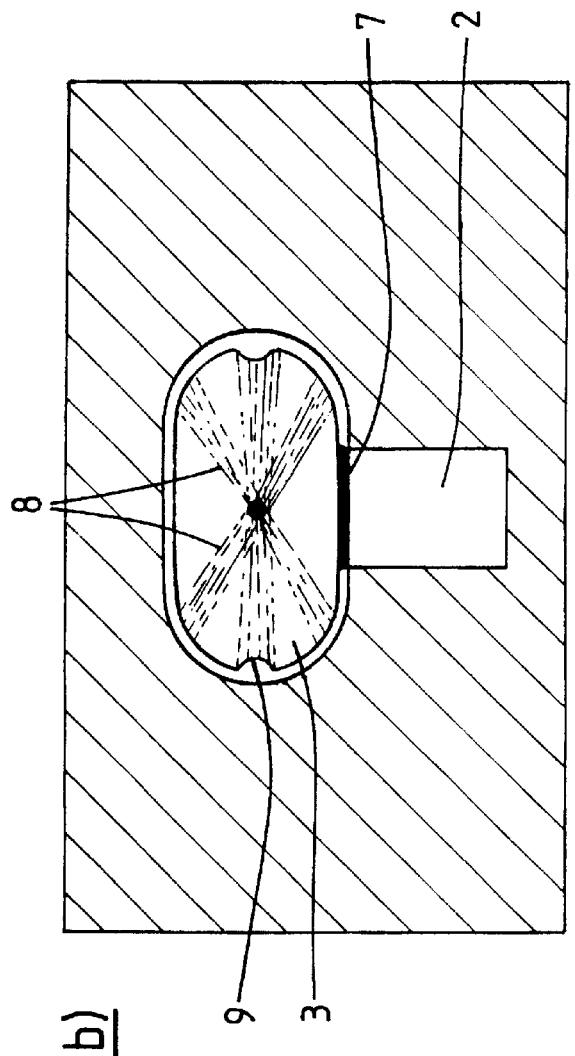
Figure 11C:
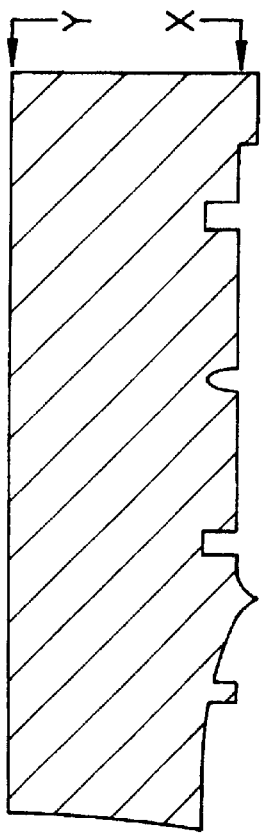

Some of the mould design modifications that can be employed to mould unitary tube/appendage mouldings are illustrated in FIGS. 11(a)–14. In these designs:
1. is the runner for molten polymer
2. is a 'flip-top' closure hinged lid
3. is a 'pop' mushroom valve
4. is a core
5. is a stem for the 'pop' valve (3)
6. is a tube side-wall
7. is a living hinge
8. are channels/grooves for enhanced polymer flow to the tube side-walls
9. is a groove for enhanced polymer flow down the side-walls of the tube 10(a). is a support locating on the mushroom valve (3)
10(b). is a support shown in a retracted position
11. are support locations on the mushroom valve (3)
12(a). are supports locating on both the core (4) and the mushroom valve (3)
12(b). is a support locating on the side of the core
13. is an extendable core support shown in the extended position
14. is a support location on the female part of the mould
15. is an extendable core support shown in the non-extended position In cases of unitary tube/appendages where core flexing or lateral core movement will not occur if the core is unsupported (for example. in large diameter tubes made with high MFI materials), FIG. 11(a) illustrates the longitudinal cross-section of a mould with unsupported core capable of producing a unitary tube/closure. FIG. 11(b) is a section plan on line X—X of FIG. 11(a), and FIG. 11(b) is an alternative X—X to Y—Y section on FIG. 11(a). In a further enhancement of the basic tool design, the tool may have a split along the X-X₁ (or X-X₂) line so that the part of the tool defined by X-X₁ (or X-X₂) and Y—Y can be separated from the part of the tool defined by X—X to Z—Z. It may be replaced with an alternative X-X₁ (or X-X₂) to Y—Y tool part [see FIG. 11(c)] incorporating a different closure design or type to enable the manufacture of a tube with a different closure. The same principle may be extended to other appendage types. The ability of this general mould design to be easily modified by means of 'change parts' for the moulding of tubes with a variety of different attachments also enables, if desired and with the appropriate 'charge parts', the moulding of tubes with no attachments-ie. 'standard' tubes with 'head and shoulders'.

In cases of unitary tube/appendage where core flexing is likely to occur if the core is unsupported, a number of designs are capable of stabilising the core against lateral movement (and hence variable wall thickness) while still permitting the moulding of the unitary tube/appendage.

Figure 12B:
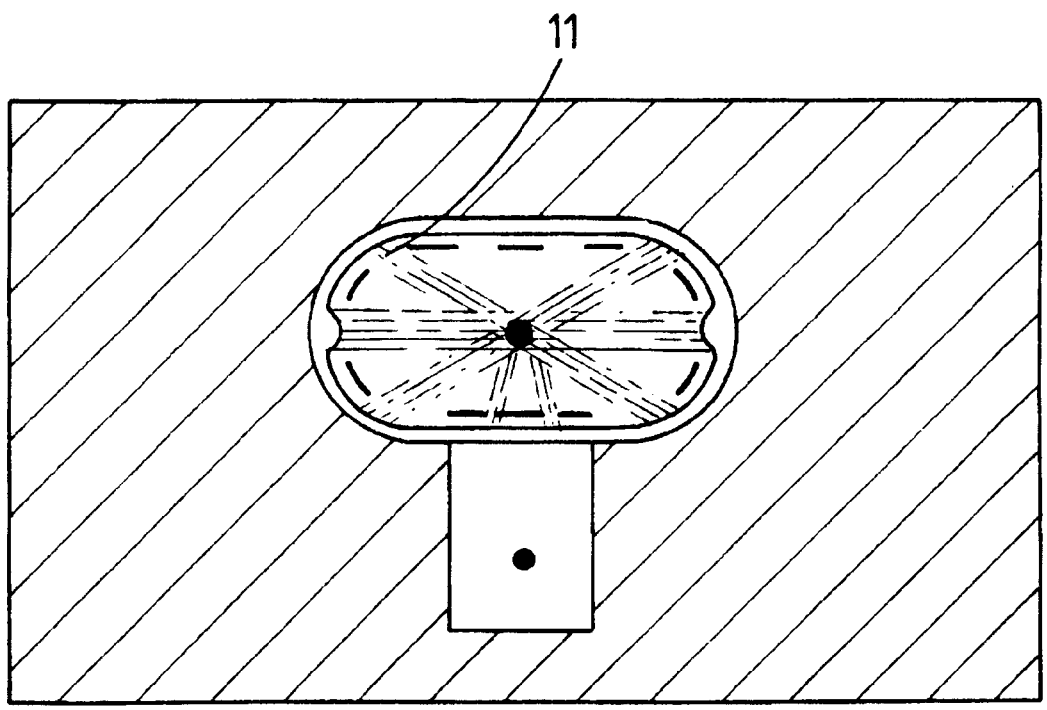

FIGS. 12(a) and 12(b) illustrate a tool design in which the core is stabilised against flexing by the use of one or more supports which are projected out from the top of the female half of the mould and press down onto the 'pop' valve on the core of the male mould during the injection of the polymer to form the article. Once the polymer has been injected to fill the mould, but prior to the shutting off the barrel valve, the supports are raised to allow polymer to flow into the gaps left by the supports, thereby ensuring the formation of completed moulding. 10(a) shows a support located on the 'pop' valve of the core, and 10(b) shows the support raised to allow polymer to flow into the gaps left by the raised support. If appropriate, the support may be located into a 'support location area' (11). FIG. 12(b) is a section plan on the X—X line, showing a series of location areas for supports on the pop-valve.

Figure 13:
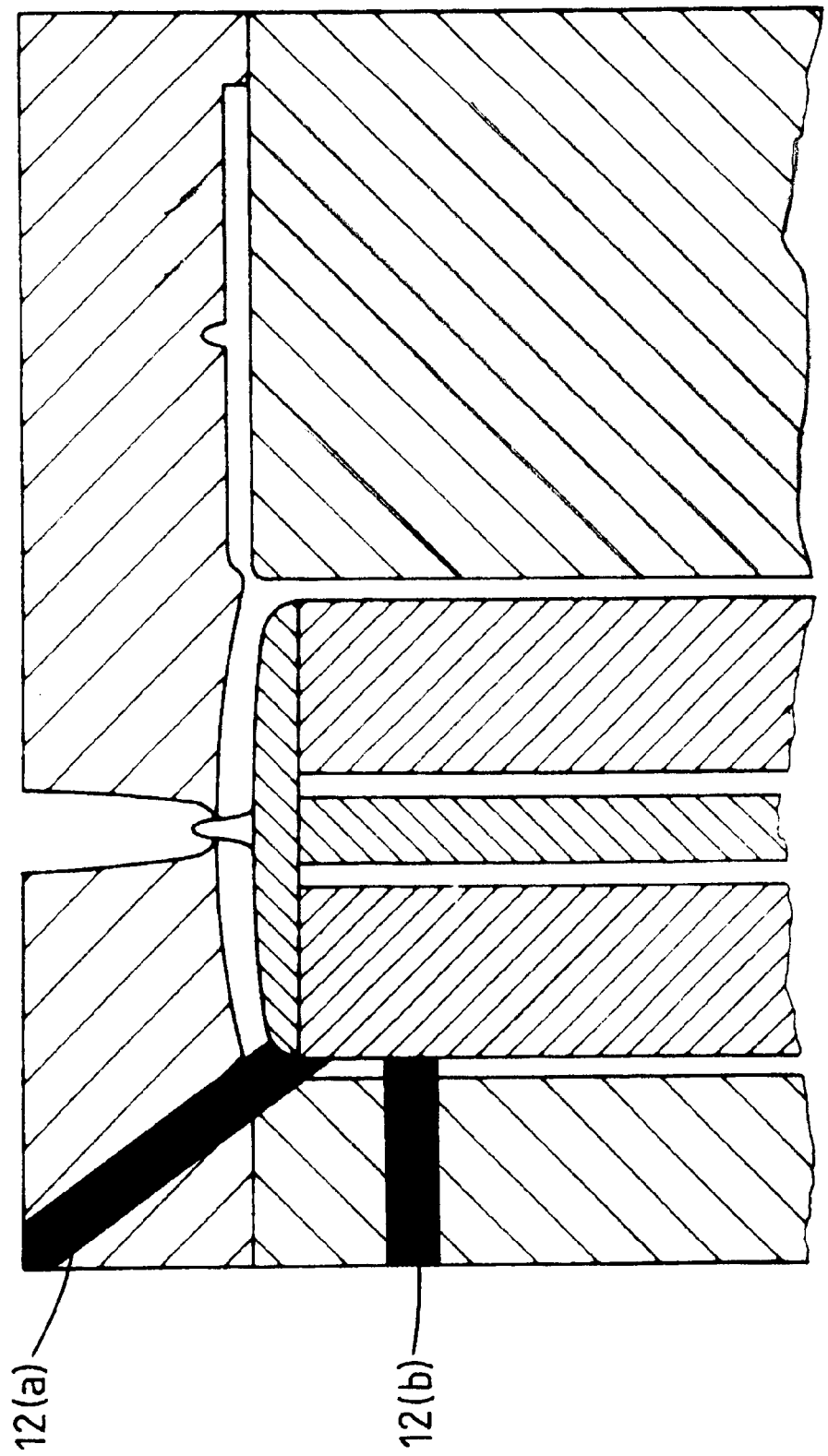

FIG. 13) illustrates a tool design in which the core is stabilised against flexing by the use of one or more supports [12(a) and 12(b)] which project out from the cavity to support the core from the side during the injection of the polymer to form the article. An advantage of support 12(b) is that it also pushes the mushroom valve (3) firmly onto the core (4), thus minimising the chances of it lifting under injection pressure. Once the polymer has been injected to fill the mould, prior to the shutting off of the barrel valve, the supports are retracted to allow polymer to flow into the holes left by the supports, thereby ensuring the formation of the completed moulding.

Figure 14:
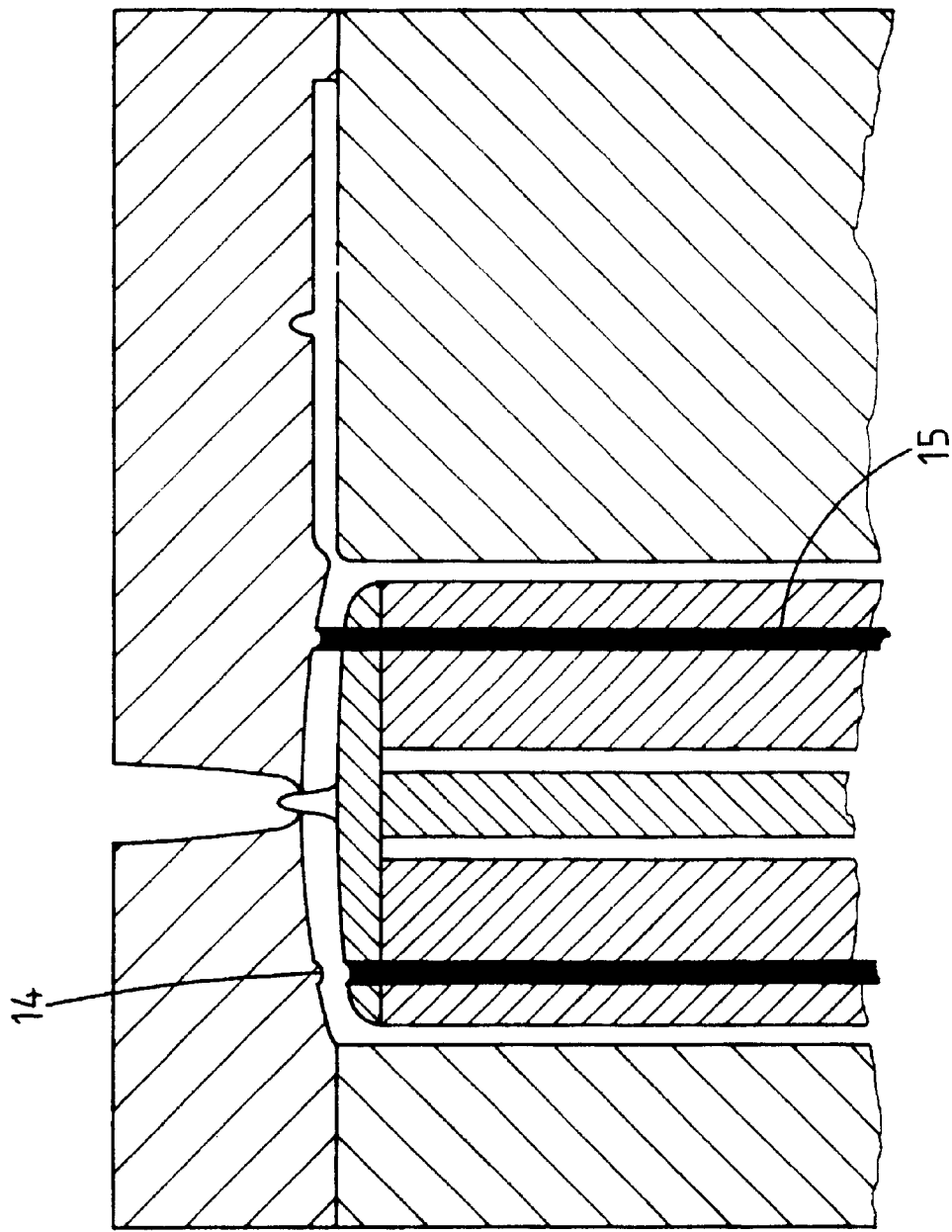

FIG. 14) illustrates a tool design in which extendible supports within the core are extended and firmly located into the female parr of the mould to 'anchor' the core against lateral core movement. Once the polymer has been injected to fill the mould, prior ro the shutting off of the barrel valve, the support is retracted to allow polymer to flow into the spaces left by the retracted support, thereby ensuring the formation of the completed moulding. A variation of the above mechanism is to project the whole core upwards to locate it into the female part of the mould, and when the polymer has been injected to fill the mould, but prior to shutting off of the barrel valve, the entire core is retracted to allow polymer to flow into the new cavity left by the retracted core, thereby ensuring the formation of the completed moulding. Another advantage of this arrangement (ie. not locating the core through the centre of the closure to be formed) is that the centre of the closure is not restricted by locating devices.

This enables the formation of quite complex closures (eg with spouts and membranes that enable effective 'cut-off' of tube contents) as per some medicine bottles. In a further variation the mould can be designed to allow a very thin film to be formed across the tip of the aperture of the closure for 'tamper evident' proof.

Among the main advantages of stabilising mechanisms such as are shown in FIGS. 12–14 is that the core supports are located 'off-centre' thereby allowing the injection point to be unimpeded in a central location. This allows for the formation of 'centrally suited' appendages such as apertures and flow control mechanisms that would otherwise need to be located 'off-centre'. If 'off-centre' positioning of apertures and other appendages is acceptable or required, central location of the support is possible via a number of mechanisms, which are well known to those practised in the art.

EXAMPLE 1

A polymer blend made from 50% Exact 4038, 20% Catalloy KS059P and 30% Montell 6100P was injection moulded to form a tubular container having a body having the form of a continuous cylinder 35 mm in diameter and 150 mm in length and a neck and shoulder portion adapted to receive a screw cap. The thickness of the continuous cylinder varied from 0.8 mm adjacent to the neck and shoulder portion to 0.5 mm at the remote end. The tubular container was found to possess properties suitable for use in, for example, the cosmetics industry.

EXAMPLE 2

A polymer blend made from 60% Exact 4038 and 40% Montell 6100P was injection moulded to form a tubular container having a body having the form of a continuous cylinder 35 mm in diameter and 150 mm in length and a neck and shoulder portion adapted to receive a screw cap. The thickness of the continuous cylinder varied from 0.8 mm adjacent to the neck and shoulder portion to 0.5 mm at the remote end. The tubular container was found to possess properties suitable for use in, for example, the cosmetics industry.

EXAMPLE 3

A polymer blend made from 24% Exact 4038, 56% Affinity 1350 and 20% Surlyn 9970 was injection moulded to form a tubular container having a body having the form of a continuous cylinder 35 mm in diameter and 150 mm in length and a neck and shoulder portion adapted to receive a screw cap. The thickness of the continuous cylinder varied from 0.8 mm adjacent to the neck and shoulder portion to 0.5 mm at the remote end. The tubular container was found to possess properties suitable for use in, for example, the cosmetics industry.

EXAMPLE 4

A polymer blend made from 24% WSM 168 (Orica Australia Pty Ltd), 56% Affinity 1350 and 20% Surlyn 9970 was injection moulded to form a tubular container having a body having the form of a continuous cylinder 35 mm in diameter and 150 mm in length and a neck and shoulder portion adapted to receive a screw cap. The thickness of the continuous cylinder varied from 0.8 mm adjacent to the neck and shoulder portion to 0.5 mm at the remote end. The tubular container was found to possess properties suitable for use in, for example, the cosmetics industry.

The ESCR Test

Six thin sections of injection moulded polymer blend, 0.65 mm thickness were used to determine environmental stress crack resistance. Sections 10 mm wide are cut transverse to he major direction of flow of the polymer blend in the mould and are subsequently created with any post-mould treatments. Each section is bent back on itself and stapled 3 mm from the bend. The bent sections are immersed in a 10% Teric N9 solution at 50° C. (Teric is a trademark of Orica Australia Pty Ltd). The strips are then regularly checked for signs of cracking. Any sign of cracking is regarded as a failure. The time at which 50% (3) of the sections have failed is regarded as the time to failure of the polymer blend. The test is concluded after 360 hours if the polymer has yet to fail.

Comparative Example A

Dow Affinity plastomer having a crystallinity of approximately 34% was injection moulded and six sections were cut from the mould and subjected to the ESCR Test. The results are shown in Table 1 below.

EXAMPLE 5 to 7

Dow Affinity plastomer having 34% crystallinity was compounded with polypropylene ADP 126 (Montell) in amounts identified in Table 1 below. The blends were injection moulded and six sections were cut from the mould and the ESCR Tests performed. The results are shown in Table 1 below.

TABLE 1

| Example | Dow Affinity Plastomer | Polypropylene ADP 126 | ESCR Test (hr) |
| --- | --- | --- | --- |
| Comparative A | 100% | | 7 |
| 8 | 97.5% | 2.5% | 30 |
| 9 | 95% | 5% | 60 |
| 10 | 60% | 40% | 360+ |

EXAMPLES 8 to 10

Dow Affinity plastomer having approximately 34% crystallinity was compounded with Surlyn 9970 (Du Pont) in amounts identified in Table 2 below. The blends were injection moulded and six sections were cut from the mould and the ESCR Tests performed. The results are shown in Table 2 below.

TABLE 2

| Example | Dow Affinity Plastomer | Surlyn 9970 DuPont | ESCR Test (hr) |
| --- | --- | --- | --- |
| Comparative A | 100% | | 7 |
| 8 | 97.5% | 2.5% | 15 |
| 9 | 95% | 5% | 30 |
| 10 | 70% | 30% | 360+ |

EXAMPLE 11

A polymer blend of 80% Dow Affinity (34%), 19% nylon B3 (BASF) and 1.2% Surlyn 9970 was blended. The polymer blend was injection moulded and subjected to the ESCR Test. The polymer blend had an ESCR Test result of 360+ hours.

EXAMPLES 12 and 13

A polymer blend of 80% Dow Affinity (approximately 34% crystallinity) and 20% Surlyn 9970 was blended and injection moulded to form a thin-walled tube. A second polymer blend of 76% Dow Affinity (24% crystallinity), 20% nylon B3 (BASF) and 4% Surlyn was blended and injection moulded to form a thin-walled container. The thin-walled containers were filled with petrol and sealed. The polymer blend incorporating 20% nylon and 4% Surlyn showed a permeability to petrol approximately 20 times less than that of the blend containing plastomer and Surlyn only.

EXAMPLE 14

Dow Affinity plastomer having approximately 34% crystallinity was compounded with $TiO_2$ in the amount identified in Table 3 below. The blends were injection moulded and six sections were cut from the mould and the ESCR Tests performed. The results are shown in Table 3 below.

TABLE 3

| Example | Dow Affinity 1300 | TiO$_2$ | ESCR Test (hr) |
| --- | --- | --- | --- |
| A | 100% | 0% | 7 |
| B | 96.5% | 3.5% | 22 |

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

What is claimed is:

1. A process for the manufacture of flexible, thin-walled articles comprising the steps of:
   (a) using a polymer blend having an ESCR as herein defined greater than 10 hours;
   (b) melting said polymer blend;
   (c) ramming molten said polymer blend into a mould having a cavity that produces a thin-walled article having a thin section of 1 mm or less in thickness, the thin section being substantially continuous for greater than 50 mm in a direction of flow of the molten polymer blend in the mould; and
   (d) removing from the mould the thin-walled article formed from the polymer blend.

2. A process according to claim 1, wherein at least one polymer of the polymer blend has an MFI exceeding ten.

3. A process according to claim 1, wherein at least one polymer of the polymer blend has an MFI exceeding twenty.

4. A process according to claim 1, wherein at least one polymer of the polymer blend has an MFI exceeding thirty.

5. A process according to claim 1, wherein the polymer blend has an ESCR greater than 100 hours.

6. A process according to claim 1, wherein the polymer blend has an ESCR greater than 200 hours.

7. A process according to claim 1, wherein the polymer blend has an ESCR greater than 360 hours.

8. A process according to claim 1, wherein the thin-walled article is a tube.

9. A thin-walled tube produced according to the process of claim 1.

10. A thin-walled tube according to claim 9, wherein the thin-walled tube is of unitary construction and incorporates an integral closure, said integral closure being formed in the mould.

11. A process for injection moulding a flexible, thin-walled article comprising the steps of:
   (a) melting a polymer blend having an ESCR as herein defined of greater than 10 hours, said polymer blend comprising at least one polymer and at least one of a compatible agent and a nucleating agent;
   (b) ramming molten said polymer blend into a mould having a cavity that produces a thin-walled article having a thin section not exceeding 1 mm thickness the thin section being substantially continuous for greater than 50 mm in a direction of flow of the molten polymer blend in the mould; and
   (c) removing from the mould the thin-walled article formed from the polymer blend.

12. A process according to claim 11, wherein at least one polymer of the polymer blend has an MFI exceeding ten.

13. A process according to claim 11, wherein at least one polymer of the polymer blend has an MFI exceeding twenty.

14. A process according to claim 11, wherein at least one polymer of the polymer blend has an MFI exceeding thirty.

15. A process according to claim 11, wherein the at least one polymer is selected from a group consisting of polyethylenes, copolymers of ethylene and at least one unsaturated olefin, plastomers, 'substantially linear' polyethylenes, branched polyethylenes, polymers and copolymers of ethylene manufactured using metallocene or other catalysts producing copolymers characterized by super-random distribution of comonomers within the polymer chains, polypropylenes, copolymers of propylene and at least one of ethylene and unsaturated olefins, polymers and copolymers of propylene manufactured using metallocene or other catalysts producing copolymers characterized by super-random distribution of comonomers within the polymer chains, polylactic acid polymers, silane polymers and mixtures thereof.

16. A process according to claim 11, wherein the at least one compatible agent is selected from a group consisting of ethylene vinyl acetate; ethylene vinyl alcohol; plasticised polyvinyl acetate and polyvinyl alcohol; alkyl carboxyl substituted polyolefins; copolymers of anhydrides of organic acids; epoxy group containing copolymers; chlorinated polyethylene; ethylene-propylene-butylene etc. copolymers; ultra low density, very low density, low density, medium density and high density polyethylene; polypropylene, polybutylene and copolymers thereof; polyester ethers; polyether-esters; acrylonitrile-methacrylate copolymers; block copolymers having styrene end blocks; half esters; amino and alkoxysilane grafted polyethylenes; vinyl addition polymers; styrene-butadiene block copolymers; acid grafted polyolefins; vinyl pyrrolidine grafted polyolefins; block copolymers of dihydric monomers; propylene graft unsaturated esters; modified polyolefins comprising amide, epoxy, hydroxy or $C_2$–$C_6$ acyloxy functional groups, polyoxazolines, fluoroelastomers, other polymeric compatibilisers suitable for use with polyolefins; particles coated with any of the above; and mixtures thereof.

17. A process according to claim 11, wherein the at least one nucleating agent is selected from a group consisting of talc, mica, compounds of various metals including oxides and silicates as well as various organic compounds, including various dyes and pigments.

18. A process according to claim 11, wherein the thin-walled article is a tube.

19. A thin-walled tube produced according to the process of claim 11.

20. A thin-walled tube according to claim 19, wherein the thin-walled tube is of unitary construction and incorporates an integral closure, said integral closure being formed in the mould.

21. A process according to claim 11, wherein the at least one polymer is polyethylene or a copolymer characterized by super-random distribution of comonomers within the polymer chains and the at least one compatible agent is a polypropylene based polymer.

22. A process according to claim 21, wherein the at least one polymer is a linear, substantially linear or branched polyethylene or a copolymer characterized by super-random distribution of comonomers within the polymer chains and the at least one compatible agent is a polypropylene based polymer.

* * * * *